US007870377B2

(12) United States Patent
Jansky

(10) Patent No.: US 7,870,377 B2
(45) Date of Patent: Jan. 11, 2011

(54) AUTOMATIC ELECTRONIC-SERVICE-GUIDE SELECTION

(75) Inventor: Martin Jansky, Espoo (FI)

(73) Assignee: Nokia Corporation, Espoo (FI)

( * ) Notice: Subject to any disclaimer, the term of this patent is extended or adjusted under 35 U.S.C. 154(b) by 755 days.

(21) Appl. No.: 11/672,064

(22) Filed: Feb. 7, 2007

(65) Prior Publication Data

US 2008/0189540 A1 Aug. 7, 2008

(51) Int. Cl.

| | |
|---|---|
| ***G06F 9/00*** | (2006.01) |
| ***G06F 9/24*** | (2006.01) |
| ***G06F 15/177*** | (2006.01) |

(52) U.S. Cl. .............................. 713/2; 713/1; 713/100; 707/705; 707/828; 707/831

(58) Field of Classification Search .................... 713/1, 713/2, 100; 707/705, 828, 831

See application file for complete search history.

(56) References Cited

U.S. PATENT DOCUMENTS

| | | | | |
|---|---|---|---|---|
| 6,167,250 | A * | 12/2000 | Rahman et al. | 455/406 |
| 6,415,148 | B1 * | 7/2002 | Chiniga et al. | 455/434 |
| 7,139,372 | B2 * | 11/2006 | Chakravorty et al. | 379/114.01 |

(Continued)

FOREIGN PATENT DOCUMENTS

| | | | |
|---|---|---|---|
| EP | 0 858 223 | A2 | 8/1996 |
| EP | 1383325 | A2 | 1/2004 |
| WO | 2004040473 | A2 | 5/2004 |
| WO | 2004100536 | A1 | 11/2004 |
| WO | 2006065074 | A1 | 6/2006 |

OTHER PUBLICATIONS

Open Mobile Alliance, Service Guide for Mobile Broadcast Services, Draft version 1.0, Mar. 24, 2006, pp. 1-168, Open Mobile Alliance, Ltd., USA.

(Continued)

*Primary Examiner*—Thomas Lee
*Assistant Examiner*—Michael J Brown
(74) *Attorney, Agent, or Firm*—Ditthavong Mori & Steiner, P.C.

(57) ABSTRACT

Embodiments of the invention are directed to identifying a bootstrap electronic service guide ("ESG"), determining how many ESGs that use a selected specification/standard are declared in the bootstrap ESG; and if the bootstrap ESG declares more than 1 ESG that uses the selected specification/standard, selecting, from the bootstrap ESG, based on a specification/standard priority-selection scheme, at least one of the ESGs that use the selected specification/standard. Embodiments of the invention are directed to determining how many ESGs that use a selected service operator are declared in the bootstrap ESG, and if the bootstrap ESG declares more than 1 ESG that uses the selected service operator, selecting, from the bootstrap ESG, based on a service-operator priority-selection scheme, at least one of the ESGs that use the selected service operator. One or more ESGs may be selected from the ESGs declared in the bootstrap ESG based on user input.

26 Claims, 19 Drawing Sheets

U.S. PATENT DOCUMENTS

| | | | | |
|---|---|---|---|---|
| 2002/0059342 | A1* | 5/2002 | Gupta et al. | 707/512 |
| 2003/0028469 | A1* | 2/2003 | Bergman et al. | 705/37 |
| 2006/0123097 | A1 | 6/2006 | Paila et al. | |
| 2007/0078807 | A1* | 4/2007 | Bond | 707/1 |
| 2007/0149193 | A1* | 6/2007 | Chong | 455/435.2 |

OTHER PUBLICATIONS

European Broadcasting Union, Digital Video Broadcasting (DVB); IP Datacast over DVB-H: Electronic Service Guide (ESG), Apr. 2006, pp. 1-79, European Telecommunications Standards Institute, France.

European Broadcasting Union, Digital Video Broadcasting (DVB); IP Datacast over DVB-H: Architecture, May 2006, pp. 1-38, European Telecommunications Standards Institute, France.

International Search Report for PCT/IB2008/000206, dated Sep. 11, 2008, pp. 1-2.

"IP Datacast over DVB-H: Electronic Service Guide (ESG)," DVB Document, vol. A099, Nov. 2005.

* cited by examiner

AUTOMATIC ELECTRONIC-SERVICE-GUIDE SELECTION

FIELD

Embodiments of the invention relate generally to electronic service guides.

BACKGROUND

Generally, an Electronic Service Guide (ESG) enables a terminal to communicate what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast programs. Such aspects may include for example: free text description, schedule, geographical availability, price, purchase method, genre, and supplementary information such as preview images or clips. Audio, video and other types of data comprising the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting. The ESG data may be transmitted using different types of wireless digital networks including digital broadband broadcast and/or multicast networks.

Multiple programs or services are often provided simultaneously to a terminal or receiver. However, users often desire only one program or service at a time. With multiple programs or services being offered, the user may need to scan the entire frequency band to find the desired available service or program. This problem is compounded when the user is mobile because the programs or services available may change. Having to scan the entire frequency band each time to find a desired program or service is time consuming and frustrating.

Thus, there exists a need for a method and system for identifying desired programs or services in a communication network in a rapid, effective, and accurate manner.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts in accordance with embodiments of the invention in a simplified form as a prelude to the more detailed description below.

Embodiments of the invention are directed to identifying a bootstrap electronic service guide ("ESG"), determining how many ESGs that use a selected specification/standard are declared in the bootstrap ESG; and if the bootstrap ESG declares more than 1 ESG that uses the selected specification/standard, selecting, from the bootstrap ESG, based on a specification/standard priority-selection scheme, at least one of the ESGs that use the selected specification/standard. Embodiments of the invention are directed to determining how many ESGs that use a selected service operator are declared in the bootstrap ESG, and if the bootstrap ESG declares more than 1 ESG that uses the selected service operator, selecting, from the bootstrap ESG, based on a service-operator priority-selection scheme, at least one of the ESGs that use the selected service operator. One or more ESGs may be selected from the ESGs declared in the bootstrap ESG based on user input.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the invention.

There are different standards and/or proprietary protocols defined for service discovery and consumption for Digital Video Broadcast-Handhelds (DVB-H). All of these standards/protocols may be simultaneously available so that different types of terminals can be used with a particular network. As such, terminals being capable of selecting among the various standards and/or protocols based on one or more selection criteria would be advantageous. Selection criteria may include, but are not limited to, interfaces that match a terminal's capabilities and operator, or user, preferences.

Figure 1:
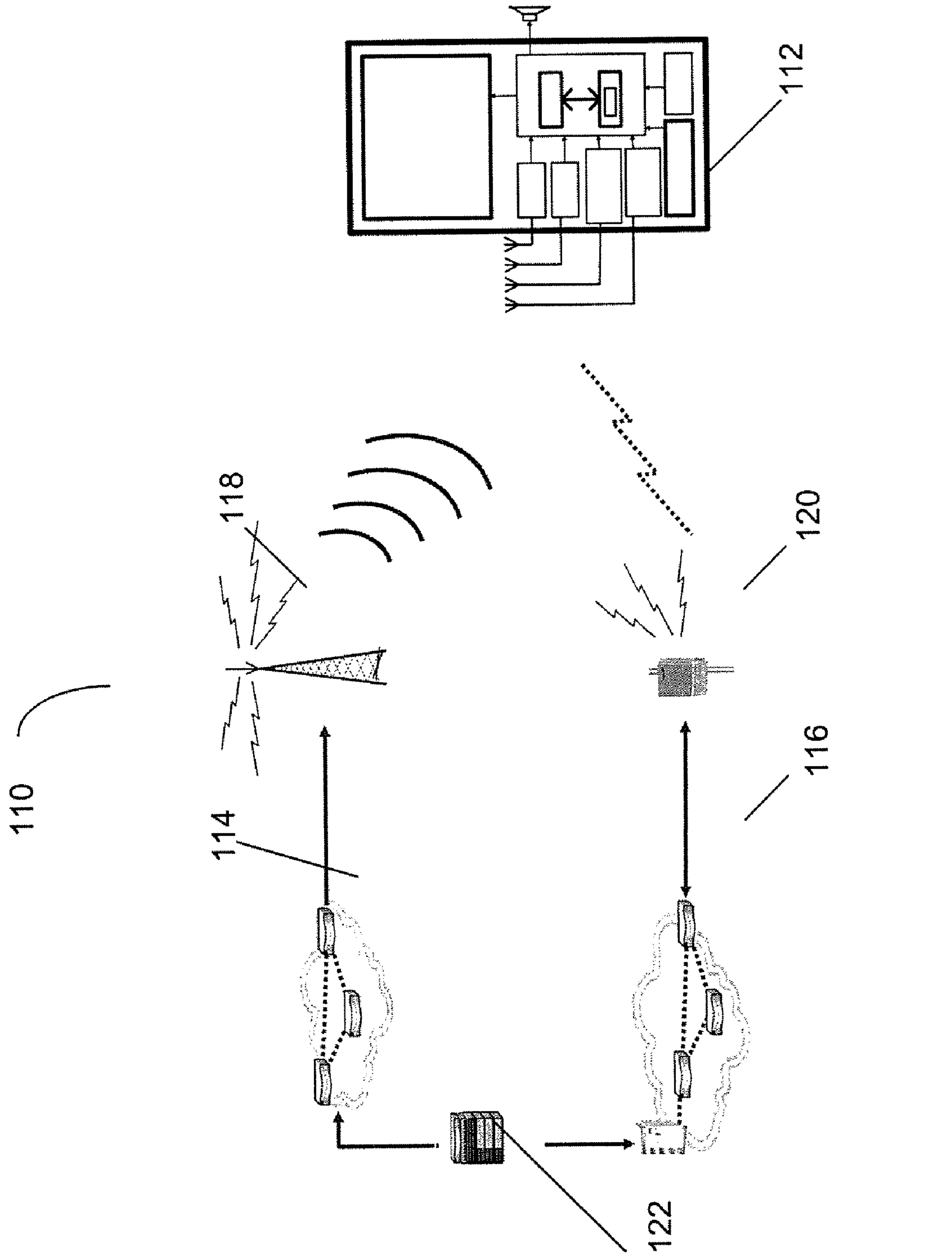
FIG. 1 illustrates a block diagram of a wireless communication system in which various aspects of the invention may be implemented.

Aspects of the invention may be utilized across a broad array of networks and communication protocols. FIG. 1 illustrates an example of a wireless communication system 110 in which the systems and methods of the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, positioning device (such as GPS (Global Positioning System) device) or combinations thereof, are in communication with a service source 122 through a broadcast network 114 and/or cellular network 116. The mobile terminal/device 112 may comprise a digital broadband broadcast receiver device. The service source 122 may be connected to several service providers that may provide their actual program content or information or description of their services and programs to the service source that further provides the content or information to the mobile device 112. The several service providers may include but are not limited to one or more television and/or digital television service providers, AM/FM radio service providers, SMS/MMS push service providers, Internet content or access providers.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One example used in digital video broadcasting (DVB) streams is an electronic program guide (EPG). One type of DVB is Digital video broadcasting-handheld (DVB-H), a recently developed technology that increases the capabilities and services available on small handheld devices, such as mobile telephones. The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, may be incorporated into the TS. This enables a receiver device to correctly process the data contained within the TS.

Aspects of the invention, however, are also applicable to other traditional digital mobile broadcast systems such as, for example, T-DAB, T/S-DMB, ISDB-T, ATSC, MediaFLO, and non-traditional systems such 3GPP MBMS and 3GPP2BCMCS.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation (2G/3G) cellular data communications network, a Global System for Mobile communications network (GSM), a Universal Mobile Telecommunications System (UMTS) or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
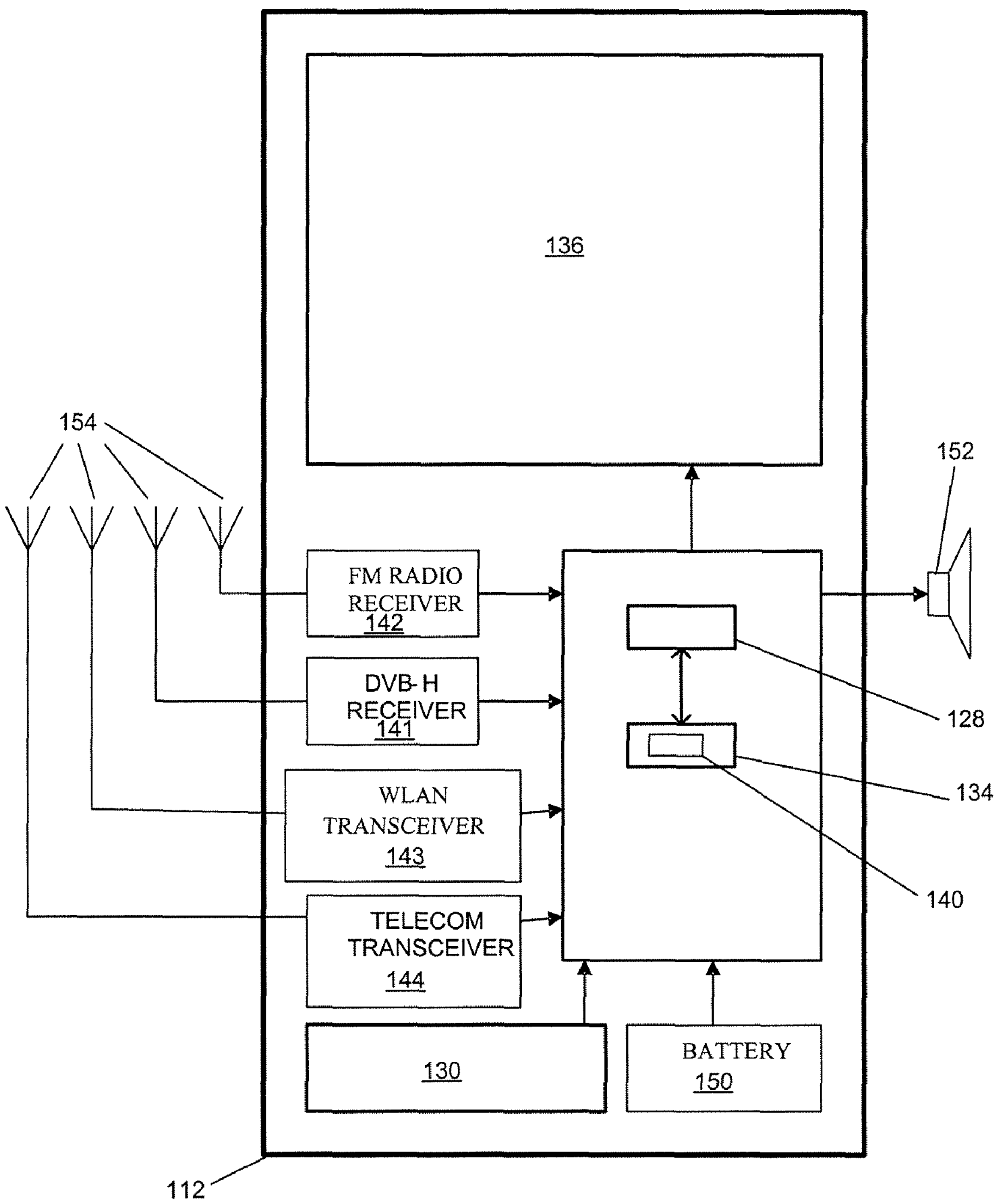
FIG. 2 illustrates a suitable digital broadcast receiver in which one or more illustrative embodiments of the invention may be implemented.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H, DVB-T or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200 50-kbit/s audio program channels or 50 200-kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In one example of the invention, ESG fragments may be delivered to a subscriber terminal in one or more data streams or channels. In this example, a plurality of channels (such as IP-packet streams) can be used to deliver ESG information to the subscriber terminal. For example, the ESG fragment may provide the subscriber terminal with notification of upcoming events to be provided by a service provider, changes in current events provided by a service provider or updated or on-going information for a user or group of users.

Figure 3:
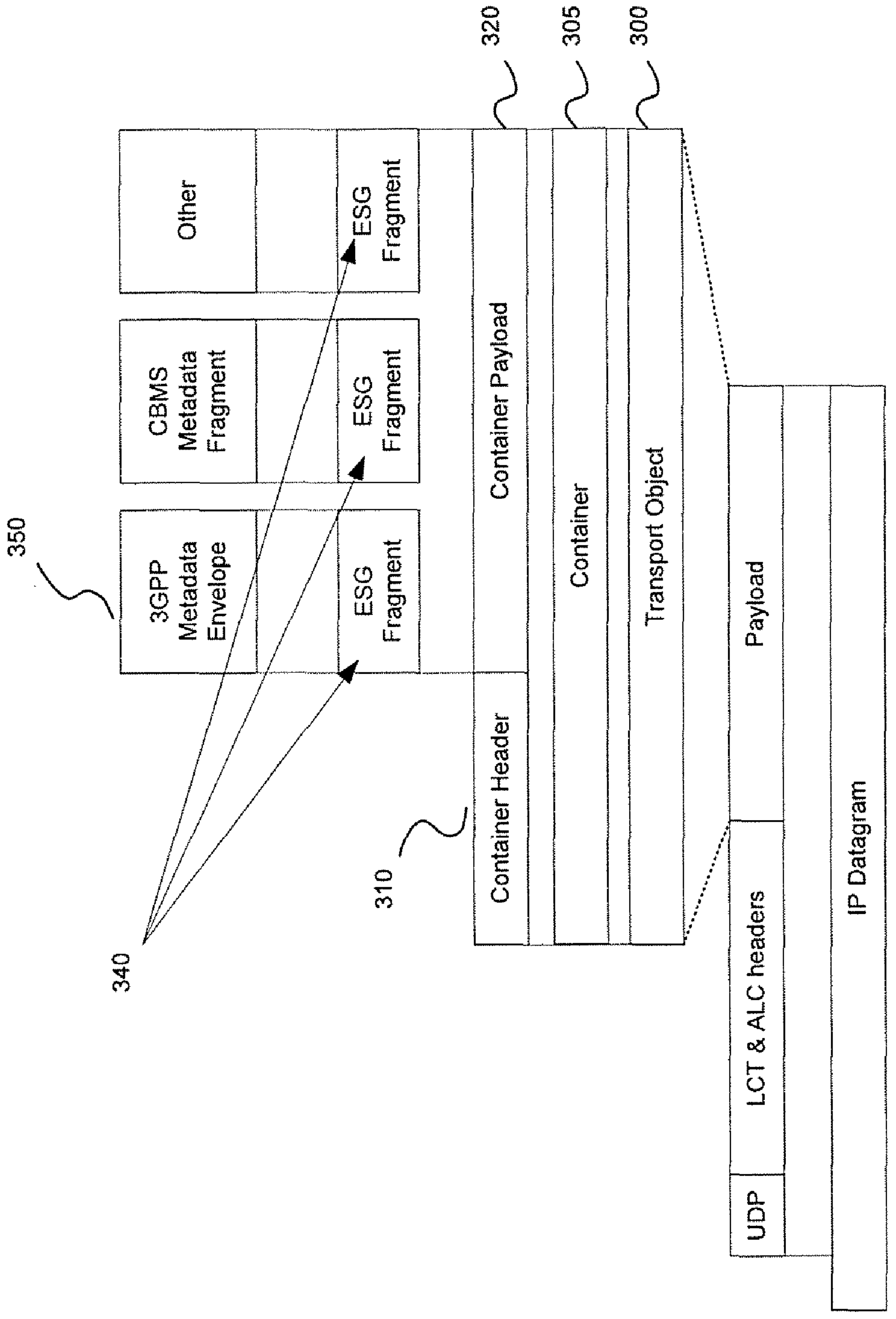
FIG. 3 illustrates a schematic diagram of an example of a transport object in which one or more illustrative embodiments of the invention may be implemented.

ESG fragments may be delivered in a transport object which may transport ESG information in a container. Thus, ESG fragments may be placed in a container that may be delivered in its own transport object. The container may further include a container header and a container payload, for example, in which the container header may provide information on where each container is located within the transport object. In one example, the transport object may contain a single container or a plurality of containers, each container including at least one ESG fragment. FIG. 3 is a diagram of an example transport object in accordance with at least one aspect of the invention. As illustrated in the example of FIG. 3, a transport object 300 may comprise a container that may include a container header 310 and a container payload 320. In one example, the container header 310 and the container payload 320 are incorporated into a single container 305 which may be incorporated into a single transport object 300 so that the container header 310 need not be recombined with information regarding where each container is located within different transported objects. Alternatively, the transport object 300 may contain a plurality of containers and a container may contain any number of ESG fragments 340. The container header 310 may contain information associated with a corresponding ESG fragment such as, for example, information regarding the container header 310 itself and/or the container payload 320.

In the example illustrated in FIG. 3, the ESG fragment 340 is contained in the container payload 320. The container header 310 may contain descriptors for identifying and describing ESG fragments in the corresponding container payload 320. Thus, the characteristics of the ESG fragment may be identified, such as but not limited to the position of the ESG fragment in the transport object 300 or the length of each contained ESG fragment 340. For example, in one embodiment, a field specifies where the particular ESG begins within the container payload 320 by providing, for example, an offset value, start and end points, or the like. In other embodiments, metadata 350 may be associated with the individual ESG fragments 340, located within or proximate to the header 310, descriptor entries, an ESG fragment 340 or a mixture thereof. In one exemplary embodiment, the association of a 3GPP metadata envelope with an ESG fragment 340 may substitute, or negate the need, for additional metadata to be located in the header 310 in relation to that particular ESG fragment.

Figure 4:
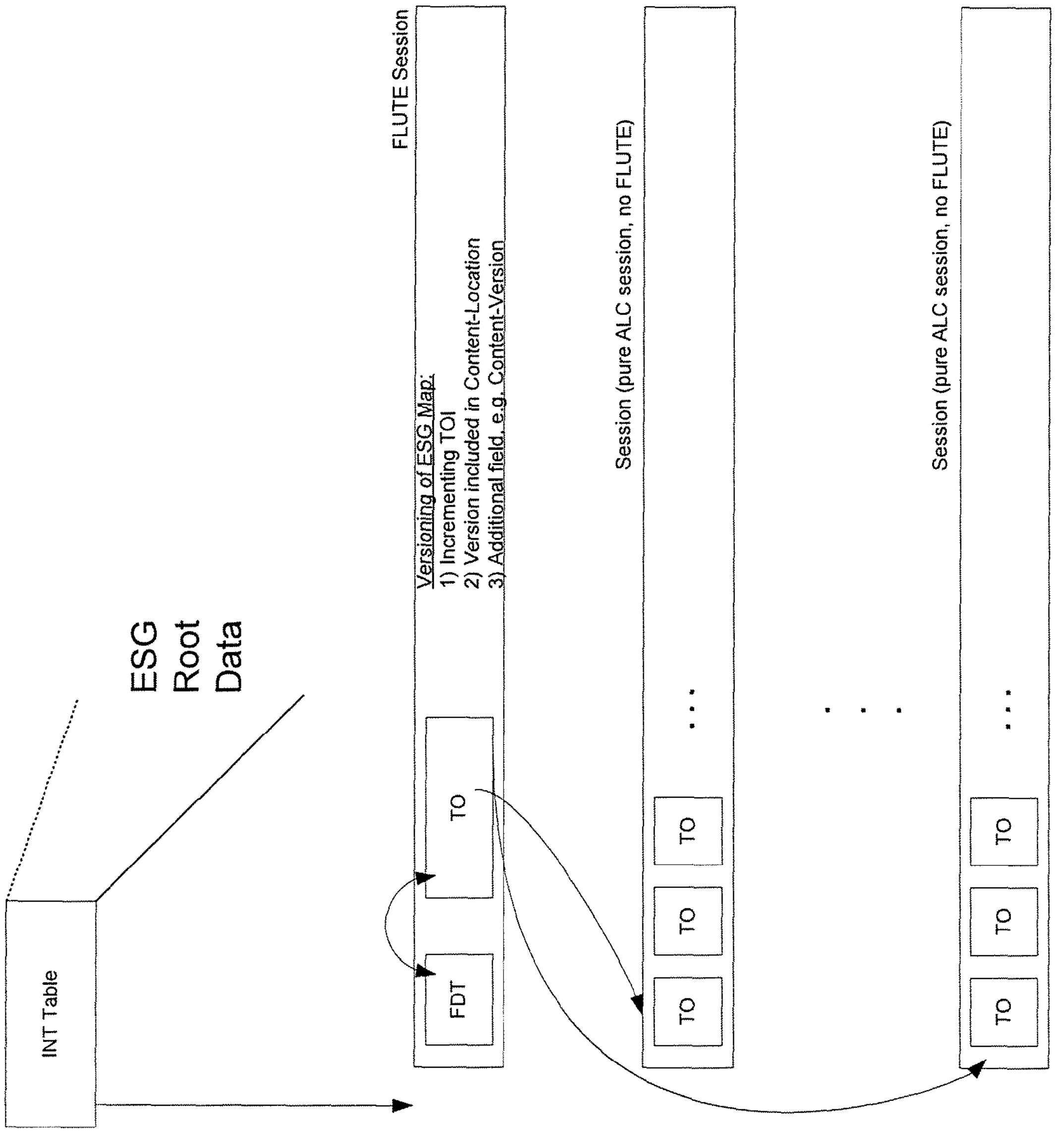
FIG. 4 illustrates examples of transporting single transport objects in which one or more illustrative embodiments of the invention may be implemented.

FIG. 4 illustrates an example of transmitting a plurality of single Transport Objects in accordance with one or more embodiments of the invention. As illustrated in FIG. 4, the Transport Objects (TO) of the current invention may be carried in, for example, FLUTE (File Delivery over Unidirectional Transport) sessions, or a pure Asynchronous Layered Coding (ALC) session. In the example of FIG. 4, the ESG Root Channel data, such as IP Address, port number and Transport Session Identifier (TSI), are announced in the IP/MAC Notification Table (INT Table) which may be, for example, carried in the SI/PSI stream in DVB-H as one of the SI tables of DVB-H. The FLUTE session of the ESG Root Channel comprises a File Delivery Table (FDT) of the session and one or more Transport Objects (TO). These Transport Objects that may be delivered in announcement carousels contain mapping between the different parts of ESGs and access parameters to the different ESG methods in which the ESG data is transmitted. The ESGs may differ from each other. For example, ESGs may be in different languages, genres or encoding.

Examples of access parameters may include, for example, IP Addresses, port numbers, TSIs, start and end times etc. The FLUTE session thus declares how the ESG data is distributed to different sessions. The TOs of the FLUTE session carrying this mapping data are described in the FDT of the FLUTE session. The ESG mapping data may be delivered in one or multiple TOs. The mapping can be made using XML Schema, plain ASCII text, Structured ASCII text such as multipart MIME or MIME headers, as binary with enumerated types or through various other means as is known in the art. The ESG data in this example may be delivered in one or more TOs, which may be within pure ALC sessions, for example. The ESG data or parts of it may be delivered in some embodiments of the invention in one or more FLUTE sessions in addition to, or instead of, ALC sessions.

A mobile terminal or receiver may receive multiple programs or services and multiple associated ESG fragments. Different ESG fragments may provide different services, programs, or content. In addition, there may be different provisioning information associated with different ESG fragments or their associated programs or services. In the event that there are multiple ESG fragments being received at a mobile terminal or receiver, the mobile terminal or receiver may choose a desired ESG fragment to receive. For example, if two service providers each provide a corresponding ESG fragment, then the mobile terminal or receiver would choose between the two incoming ESG fragments.

The different ESG fragments may vary in scope or details. In one example to illustrate, one of the ESG fragments may contain basic information regarding the corresponding program or service. The basic information may include, for example, a name of a program or a time of broadcast of the program. The other ESG fragment may include more detailed information. For example, the other more detailed ESG fragment may contain information regarding biographies of the actors, interviews with the actors or other individuals involved with the program, interactive services, etc. In this way, different information may be provided depending on the ESG fragment being transmitted and received.

The different ESG fragments may differ in accessibility. For example a first ESG fragment may contain basic information on a program and may be free to the subscriber. However, a second ESG fragment with more detailed information regarding the program (e.g., biographies of the actors, etc.) may be available for a fee only. In this example, ESG fragments may further include purchasing information, if applicable.

The ESG fragments may further vary based on validity and availability. One ESG fragment may be available between certain dates and times while another ESG fragment may be available between different dates and times. This information (i.e., validity information) may further be included in the corresponding ESG fragments.

Figure 5:
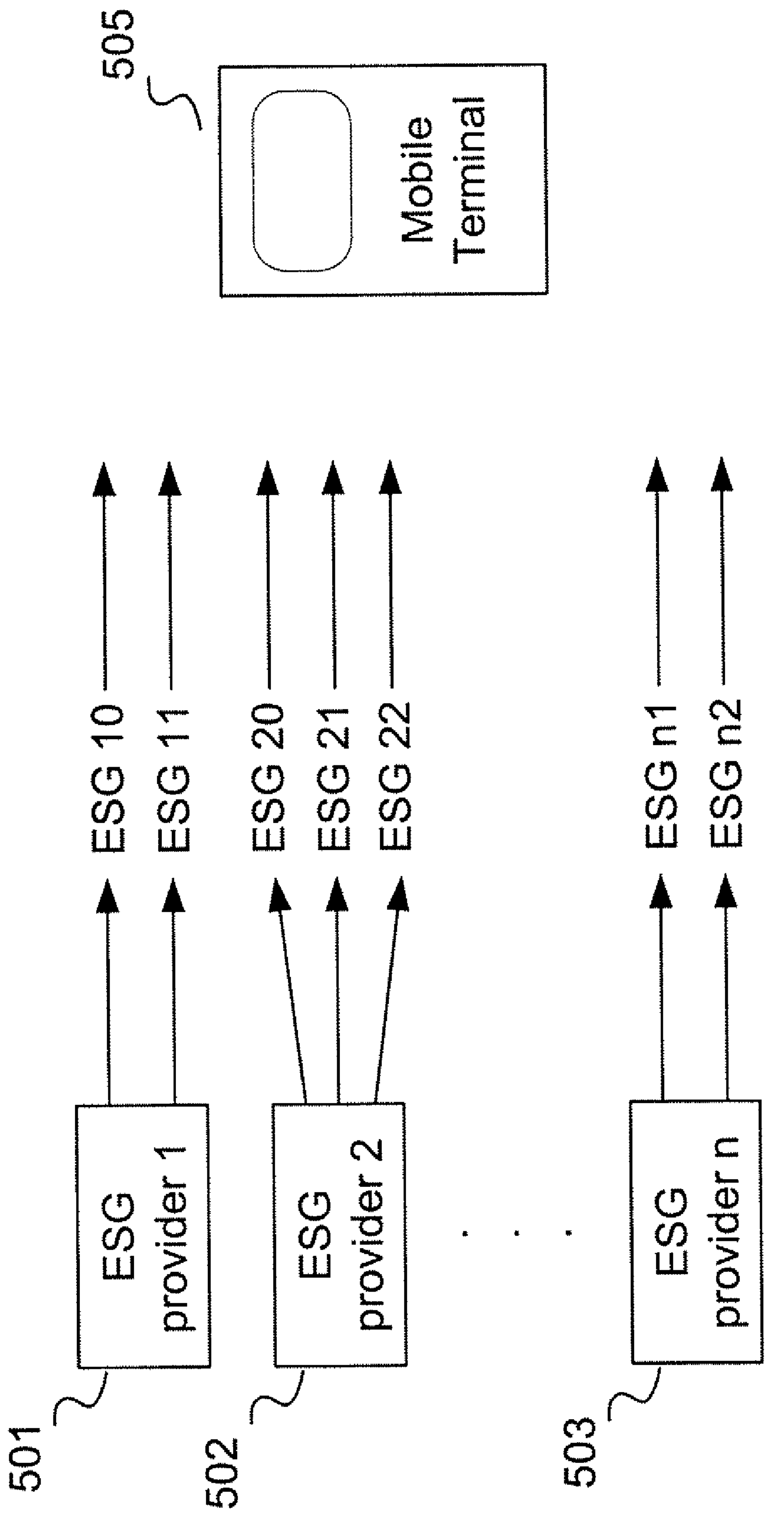
FIG. 5 illustrates an example of providing service guide information to a mobile terminal in which one or more illustrative embodiments of the invention may be implemented.

FIG. 5 illustrates one example of multiple ESG fragments being transmitted to a terminal or receiver in accordance with one or more embodiments of the invention. In this example, n ESG providers are illustrated (1-n), each transmitting corresponding ESG fragments. For example, ESG provider 1 (501) provides ESG 10 and ESG 11, ESG provider 2 (502) provides ESG fragments 20, 21, and 22, and ESG provider n (503) provides ESG n1 and ESG n2 to mobile terminal 505. In this example, mobile terminal 505 may select a desired ESG fragment from the available ESG fragments. Thus, the mobile terminal 505 may select a desired ESG fragment from ESG 10, 11, 20, 21, 22, . . . n1, and n2. For example, the mobile terminal 505 may scan the frequency band in order to find the available services. Based on the available services as indicated by the available ESG fragments, the mobile terminal 505 may select a desired ESG.

Figure 6:
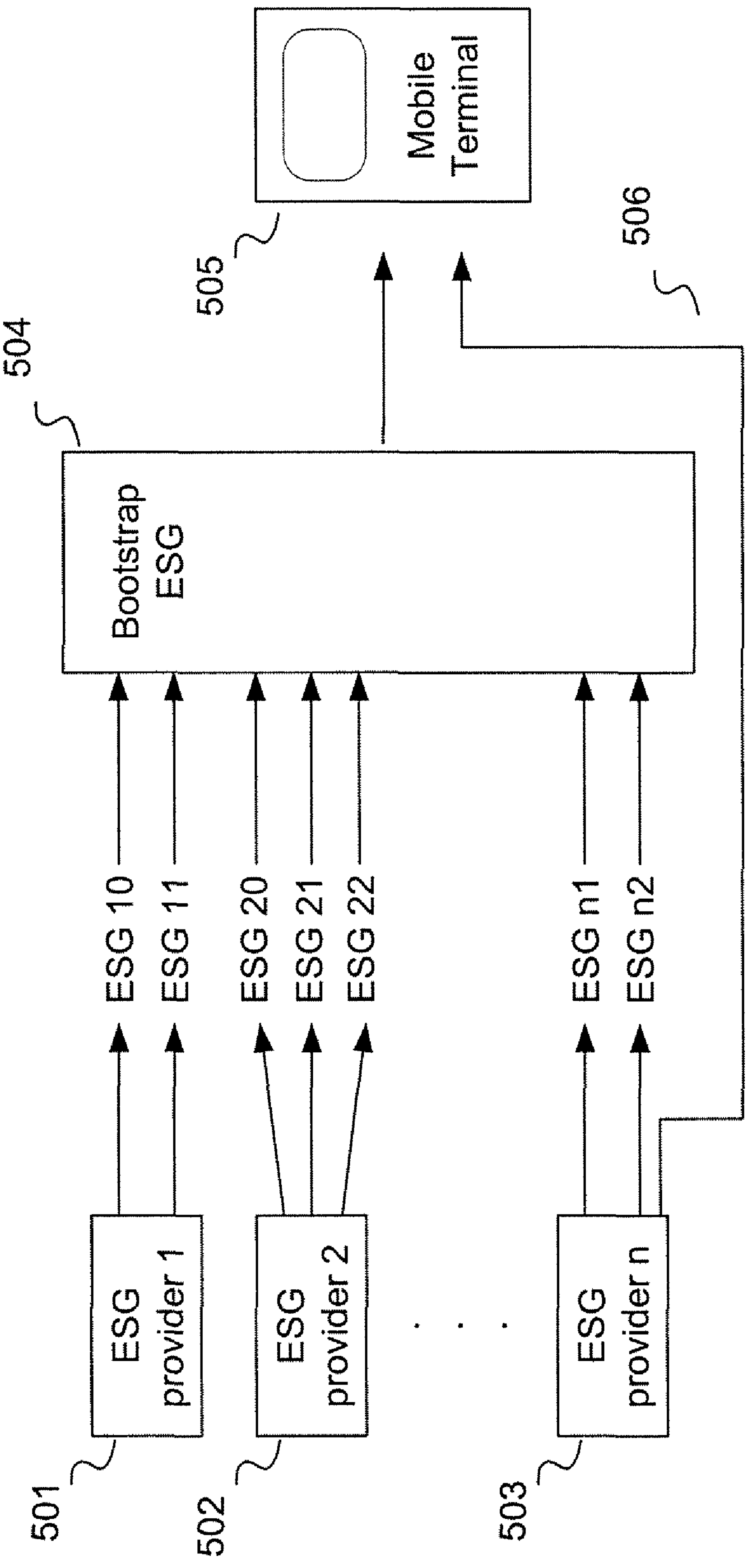
FIG. 6 illustrates another example of providing service guide information to a mobile terminal in which one or more illustrative embodiments of the invention may be implemented.

FIG. 6 illustrates an example of one or more embodiments of the present invention in which a bootstrap ESG is provided for managing incoming ESG fragments from ESG providers. In this example, multiple ESG providers, each different in scope, are transmitting corresponding ESG fragments. For example, ESG provider 1 (501) transmits ESG 10 and ESG 11 and ESG provider 2 (502) transmits ESG 20, ESG 21, and ESG 22. There may be any number of ESG providers providing any number of ESG fragments. In the example illustrated in FIG. 6, there are n ESG providers. ESG provider n (503) transmits ESG n1 and ESG n2 to the mobile terminal 505.

Also in this example, a bootstrap ESG 504 is provided which may provide information on the availability or scope of individual ESG fragments to a user. The bootstrap ESG 504 contains information for each of the incoming ESG fragments from the ESG providers (501, 502, 503) such that a mobile terminal 505 may access the information in the bootstrap ESG 504 to obtain information on the individual ESG fragments (herein alternatively referred to as "secondary ESG fragments"). The information in the bootstrap ESG 504 may include, for example, identification information (e.g., Operator ID), IP address or port number for ESG fragments or corresponding ESG providers, purchasing information for the ESG (e.g., if ESG is free for everyone, free for registered users only, or if there is a charge for the ESG), purchasing channel associated with the ESG (e.g., access to purchasing the ESG), URI of the ESG, service provider identifier, last update of the ESG fragment, next expected update of the ESG fragment, validity dates or times for each corresponding ESG fragment. In this example, a mobile terminal 505 may identify desired ESG fragments. For example, a mobile terminal 505 may wish to receive certain ESG fragments from certain ESG providers that are valid during certain times or dates. By accessing the bootstrap ESG 504, the mobile terminal 505 is provided with information on secondary ESG fragments from which to choose. Also, any ESG fragment may be delivered to the mobile terminal 505 directly without being referred to in the bootstrap ESG 504 if desired, as illustrated by element 506 in FIG. 6.

In addition, the information on ESG fragments in the bootstrap ESG 504 may be used to update the information in the mobile terminal 505. Updated information may be received from the bootstrap ESG 504 such that the mobile terminal may contain current information regarding the ESG fragments. In one example, updating of the ESG fragments in the mobile terminal 505 may occur continuously to provide the latest information. In this example, the mobile terminal 505 may monitor the IP address associated with the bootstrap ESG 504 by listening to the corresponding IP address. When an update is available, for example, in one of the ESG fragments in the bootstrap ESG 504, the update may be transmitted to the mobile terminal, and the mobile terminal may receive the update. Alternatively, ESG fragment information in the bootstrap ESG 504 may be updated when an update is announced or when an update is expected.

In addition, the information in the bootstrap ESG 504 may be updated from the individual ESG providers. For example, the bootstrap ESG 504 may receive updated information when available from the corresponding ESG providers. Alternatively, updates may be sent on a periodic basis.

The bootstrap ESG 504 may be provided in a variety of ways. In one example, one ESG provider may provide the bootstrap ESG 504. In this example, the different ESG providers may agree to designate one of the ESG providers as providing the bootstrap ESG 504. After an ESG provider is chosen to provide the bootstrap ESG 504, the ESG providers provide the designated ESG provider with necessary ESG fragments or links to the ESG data. ESG providers may further provide a combination of ESG fragments and links to ESG fragments. Based on the information received, the designated ESG provider provides the bootstrap ESG. Alternatively, a separate entity may be elected to provide the bootstrap ESG 504. For example, an ESG aggregator may be selected to provide the bootstrap ESG 504. The ESG providers may provide the necessary ESG fragment data to the ESG aggregator. The ESG aggregator may create the bootstrap ESG 504 to include, for example, operator identification information, IP address-port number, etc. It is noted that any entity may serve as an ESG aggregator. As another example, the ESG aggregator may be a datacast operator (i.e., a network operator that delivers services of different operators or service providers).

The bootstrap ESG 504 may be identified by a mobile terminal 505 by using service discovery methods. For example, the bootstrap ESG may have a fixed IP address and/or port number. In this example, the bootstrap ESG 504 may contain data tables and/or descriptors including identifier information. Such identifier information may include, for example, a character string descriptor element describing the IP address of the bootstrap ESG 504. Also, the bootstrap ESG 504 may contain an identifier for a port address. The mobile terminal 505 may search the identifier information of the bootstrap ESG 504 and may determine the existence of the bootstrap ESG 504. Based on the information provided in the bootstrap ESG 504, a mobile terminal 505 may identify the bootstrap ESG 504.

Thus, in this example, a mobile terminal 505 may identify a bootstrap ESG 504 by identifying parameters within the bootstrap ESG 504 that may describe an IP address or port address corresponding to the bootstrap ESG 504. The bootstrap ESG 504 may contain updated ESG fragment information from ESG service providers (501, 502, 503). This information may be continuously updated, periodically updated, or updated when an update is announced or when an update is expected. The bootstrap ESG 504 may further provide the information to the mobile terminal 505. For example, the bootstrap ESG 504 may provide identifier or descriptive information on an operator, an IP address-port number, purchasing information (e.g., information on buying or subscribing to the ESG), a service provider identifier, etc.

The mobile terminal 505 may update information already contained in the mobile terminal 505 with updated information from the bootstrap ESG 504. In this example, a desired ESG fragment is selected from the bootstrap ESG 504 and downloaded to the mobile terminal 505. A user at a mobile terminal 505 may view a list of available ESG fragments and may select a desired ESG fragment from the list. In one example, different types of ESG fragments may be identified by any number of identifying symbols, colors, etc. For example, free ESGs may be displayed in a different color or font than purchasable ESGs.

In addition, the user at a mobile terminal 505 may also request a bootstrap ESG 504. In this example, a user at the mobile terminal 505 may send a request for the bootstrap ESG by specifying a corresponding IP address-port number combination. The user at the mobile terminal 505 may receive access parameters in response to the request. Based on the access parameters received, the mobile terminal 505 may receive information for tuning the mobile terminal to the corresponding announcement channel to receive the desired ESG fragment. Alternatively, the user at the mobile terminal 505 may also receive a cellular broadcast to receive access information for the desired bootstrap ESG 504.

Figure 7:
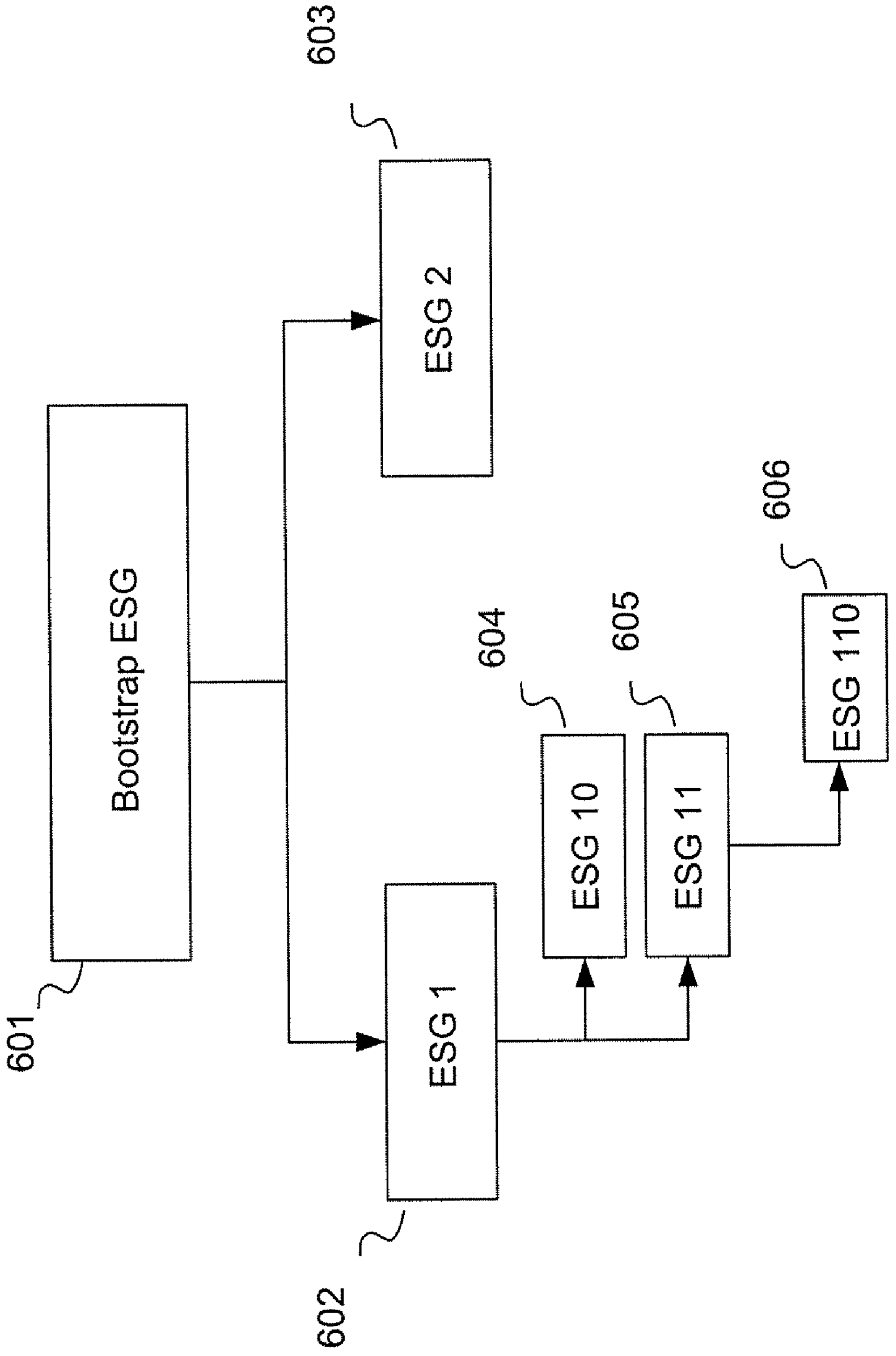
FIG. 7 illustrates an example of a bootstrap ESG and a hierarchical structure of service guide information in which one or more illustrative embodiments of the invention may be implemented.

As described above, a bootstrap ESG may contain information on ESG fragments (e.g., secondary ESG fragments). In addition, ESG fragments may be nested within other ESG fragments such that an ESG fragment may contain information on another ESG fragment. In addition, a bootstrap ESG may contain information on another bootstrap ESG. FIG. 7 is a block diagram illustrating an example of a hierarchical relationship between ESG fragments and bootstrap ESG fragments in accordance with one or more embodiments of the invention. As FIG. 7 illustrates, a bootstrap ESG 601 refers to, or contains, information pertaining to two ESG fragments, ESG 1 (602) and ESG 2 (603). Bootstrap ESG 601 may also update the information pertaining to the ESG 1 (602) and ESG 2 (603) as needed, for example, by updating the information when an update is announced or expected or by listening to the IP address of the ESG providers and downloading the updated information. The information stored and provided in the bootstrap ESG 601 may include, for example, identification information, IP address-port number, or other information pertaining to the ESGs. In addition, the bootstrap ESG 601 may also contain an IP address and port number, for example, as a descriptor or within data tables, such that a user at a mobile terminal may identify the bootstrap ESG.

In the example illustrated in FIG. 7, ESG 1 further contains information on additional ESGs. As illustrated, ESG 1 informs ESG 10 (604) and ESG 11 (605). Hence, in this example, ESG 10 (604) and ESG 11 (605) may be subsets of ESG 1. Also illustrated in this example, ESG 11 (605) contains information on ESG 110 (606) which is a subset of ESG 11 (605). Any ESG may contain data from any other ESGs. For example, ESGs lower in the hierarchy may contain data from any ESG higher in the hierarchy. To illustrate this example, any of ESG 10 (604) or ESG 11 (605) may contain data from other ESGs higher in the hierarchy that are not in the direct chain of the ESGs such as ESG 2 (603). Likewise, ESGs may contain data from any ESG lower in the hierarchy. For example, ESG 2 (603) may contain data from ESG 110 (606).

In addition, ESGs may contain information on any other ESG. In one example, an ESG higher in the hierarchy may contain information on or refer to any ESG lower in the hierarchy. To illustrate this example, the bootstrap ESG 601 may contain information on ESG 10 (604) or ESG 11 (605). In this example, an ESG skips levels to contain information on other ESG fragments that are more than one level below in the hierarchy. Alternatively, ESGs that are in different branches of the hierarchy may contain information on other ESGs. As an example to illustrate, ESG 2 (603) may contain information on ESG 10 (604), ESG 11 (605), or ESG 110 (606).

In another example, any ESG may also be a bootstrap ESG and may provide information on the scope or details of other ESG fragments. For example, an ESG lower in the hierarchy may also be a bootstrap ESG. As FIG. 6 illustrates, ESG 1 (602) may also be a bootstrap ESG that informs ESG 10 (604) or ESG 11 (605).

Figure 8:
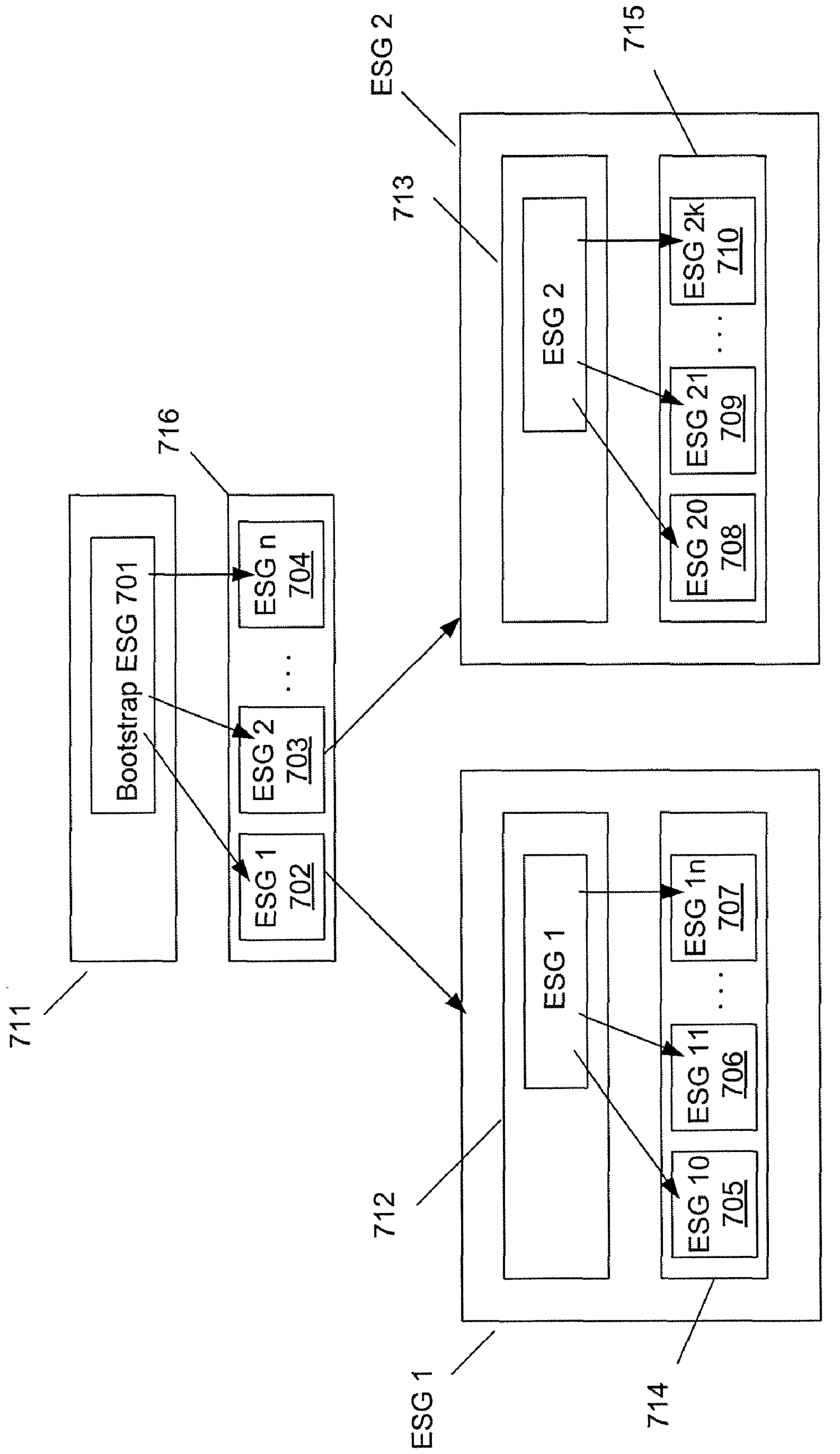
FIG. 8 illustrates another example of a bootstrap ESG and hierarchical structure of service guide information in which one or more illustrative embodiments of the invention may be implemented.

FIG. 8 illustrates another example of an ESG fragment hierarchy in accordance with one or more embodiments of the invention. In this example, a bootstrap ESG 701 is transmitted over a bootstrap ESG announcement channel 711. Information on the bootstrap ESG is provided to a user at a mobile terminal. This information may include, for example, identifier information for the bootstrap ESG 701 itself or method of accessing the bootstrap ESG 701. Similarly, the ESGs that the bootstrap ESG 701 refers to, or in which bootstrap ESG 701 contains information, may be provided to a user at a mobile terminal over a bootstrap ESG delivery channel 716. In this example, the bootstrap ESG 701 contains information on n ESGs (ESG 1 (702), ESG 2 (703), ESG n (704)). Each of the ESGs in which the bootstrap ESG contains information may contain information in an ESG announcement channel. For example, ESG 1 (702) may provide information on ESG announcement channel 712. This information may include, for example identifier information for ESG 1 or information on accessing ESG 1. Likewise, identifier or access information for ESG 2 may be provided via ESG announcement channel 713.

As FIG. 8 illustrates, each of ESG 1 (702) and ESG 2 (703) may contain information on other ESGs. ESG 1 (702) contains information on n ESGs that may be delivered over an ESG delivery channel, including ESG 10 (705), ESG 11 (706) and ESG 1*n* (707), and ESG 2 (703) informs k ESGs, including ESG 20 (708), ESG 21 (709) and ESG 2*k* (710). ESG 10 (705), ESG 11 (706) and ESG 1*n* (707) may be delivered over ESG delivery channel 714. Likewise, ESG 20 (708), ESG 21 (709) and ESG 2*k* (710) may be delivered over ESG delivery channel 715.

In another example, ESG 1 (703) may be a second level bootstrap ESG that may announce or declare other ESGs such as ESG 10 (705), ESG 11 (706) and ESG 1*n* (707). To illustrate, ESG 1 may be an ESG corresponding to programming services that may contain information on ESG 10 (705) corresponding to a live ice hockey game and ESG 11 (706) corresponding to all movies having a parental rating of at least 12 years of age.

Figure 9:
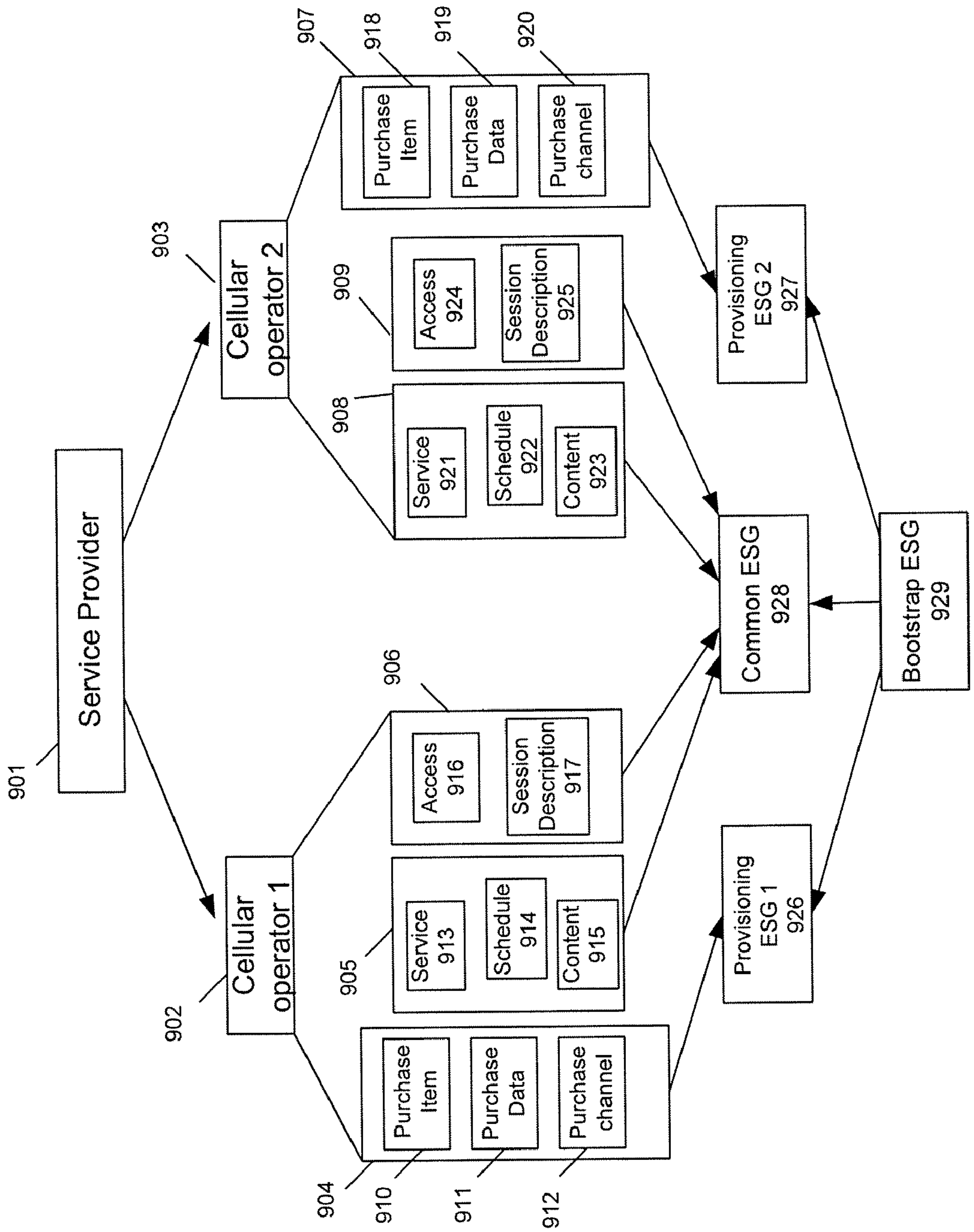
FIG. 9 illustrates an example of providing service guide information in a bootstrap ESG in which one or more illustrative embodiments of the invention may be implemented.

FIG. 9 illustrates another example of arrangement of ESGs in accordance with one or more embodiments of the invention. In this example, a service provider 901 provides ESG data to several cellular operators. As illustrated, service provider 901 provides ESG data to cellular operator 1 (902) and cellular operator 2 (903). Each cellular operator (902 and 903) provides its own provisioning fragments (904 and 907, respectively). The provisioning fragments include purchase item (910, 918), purchase data (911, 919), and purchase channel (912, 920). However, each cellular operator (902 and 903) also provides a respective core (905, 908) and access (906, 909) fragments. The core fragments (905, 908) contain the respective service fragments (913, 921), schedule fragments (914, 922) and content fragments (915, 923), and the access fragments (906, 909) contain the respective access fragments (916, 924) and session description fragments (917, 925).

In this example, the ESG data is from a single service provider 901 and is therefore common to both cellular operators (902, 903). However, each of the cellular operators (902, 903) may also have different provisioning fragments (904, 907) as each cellular operator (902, 903) may have different purchasing requirements. Thus, in this example, a bootstrap ESG 929 may declare a common ESG fragment 928 that contains the ESG fragments in common with the two cellular operators (902, 903) in one ESG fragment (e.g., the respective service, schedule, content, access, and session description fragments). Also, each of the respective provisioning fragments (904, 907) may be placed into separate ESG fragments, such as provisioning ESG 1 (926) and provisioning ESG 2 (927), respectively. In accordance with one or more embodiments of the invention, the ESG fragments containing the respective provisioning fragments may also be declared or referred to by the bootstrap ESG 929, as illustrated in FIG. 9.

Figure 10:
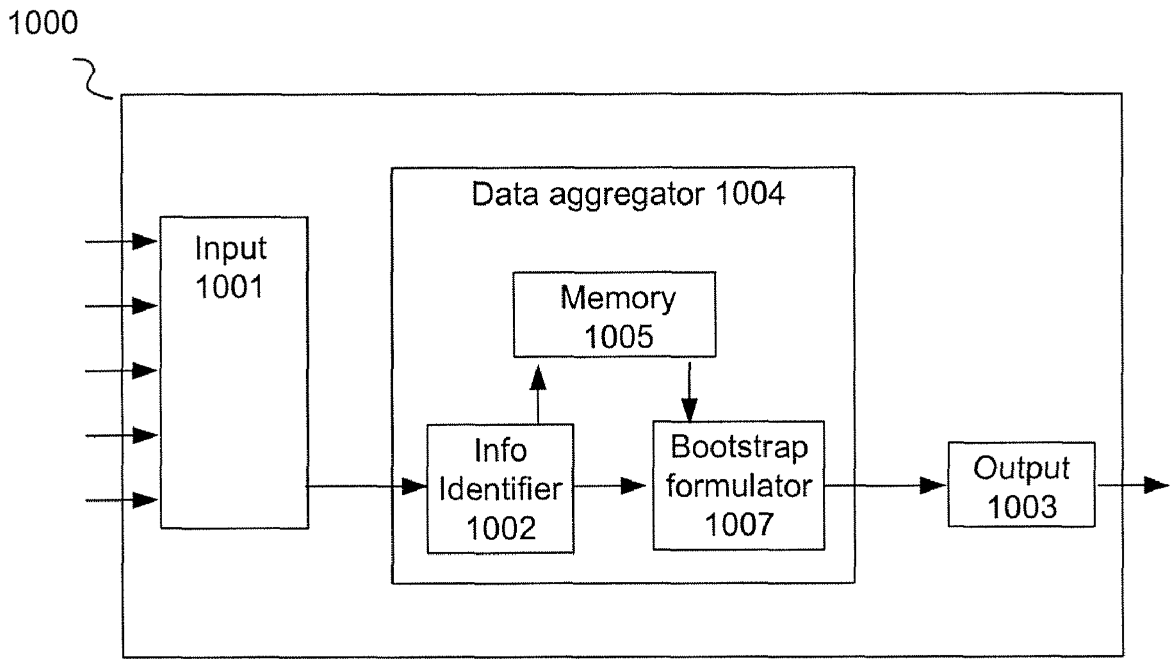
FIG. 10 is a block diagram illustrating an example of an ESG aggregator in which one or more illustrative embodiments of the invention may be implemented.

A bootstrap ESG may be created by any apparatus capable of assembling service guide data to provide to a mobile terminal. For example, an ESG provider or operator or a datacast operator may be designated as an apparatus or system for providing a bootstrap ESG. Also, a separate apparatus or system may be designated to provide the bootstrap ESG. FIG. 10 is a block diagram illustrating an example of an apparatus for creating a bootstrap ESG in accordance with one or more embodiments of the invention. In this example, an ESG aggregator 1000 is provided for receiving information pertaining to a service guide from a plurality of sources, such as ESG providers, and creating a bootstrap ESG. The ESG aggregator 1000 illustrated in FIG. 10 includes an input 1001 for receiving data from a service guide data source. For example, a service provider or ESG provider may transmit ESG data fragments or links to ESG data to the ESG aggregator 1000. The input 1001 of the ESG aggregator 1000 may receive the data or links to data and include the data in a bootstrap ESG.

The ESG aggregator 1000 may also include a data aggregator 1004. The data aggregator 1004 may receive service guide information from input 1001 which may receive the information from a plurality of service providers or a plurality of operators. The information may be included in a bootstrap ESG. For example, an operator identifier may be received from a first operator and associated service guide information for a corresponding program or service. The information may be received at the input 1001 and may be included within a bootstrap ESG by the data aggregator 1004. The ESG aggregator 1000 may further receive an operator identifier and associated service guide information from a second operator. This information may be received at the input 1001 and also included in the bootstrap ESG by the data aggregator 1004. In the example illustrated in FIG. 10, the data aggregator 1004 includes an information identifier 1002 for identifying service guide information received via input 1001 to be included in the bootstrap ESG. The service guide information may further be stored in a memory 1005 for inclusion in a bootstrap ESG. Alternatively, the service guide information may be transmitted to a bootstrap formulator 1007. The bootstrap formulator 1007 may receive stored service guide information from the memory 1005 or may receive service guide information from the information identifier 1002 in this example.

Any information corresponding to the respective ESG fragments may be included in the bootstrap ESG by the bootstrap formulator 1007 of the data aggregator 1004. For example, the bootstrap formulator 1007 of the data aggregator 1004 may include an IP address-port number corresponding to the source of the ESG data, purchasing information in a corresponding ESG (e.g., the data may indicate if a corresponding program or service is free, available to registered users only, available for a fee, etc.), a URI of the ESG fragment, a service provider identifier if the service provider is different from the operator, a date or time of last update, a date or time of an expected next update, validity information, etc. Thus, data from multiple ESG fragments may be included in the bootstrap ESG by the bootstrap formulator 1007 of the data aggregator 1004.

The ESG aggregator 1000 may further include an output 1003 for providing the bootstrap ESG to a user or receiver. The bootstrap ESG as described may include information from a plurality of ESG fragments. The information may further be provided in a hierarchical structure such that any ESG fragments, including ESG fragments referenced in the bootstrap ESG, may reference other ESG fragments. The output 1003 may thus provide a list of available ESG fragments in the bootstrap ESG from which a user may select a desired ESG fragment. For example, a desired ESG fragment may identify an operator, a service provider, a valid program or service, purchasing information, etc.

Figure 11:
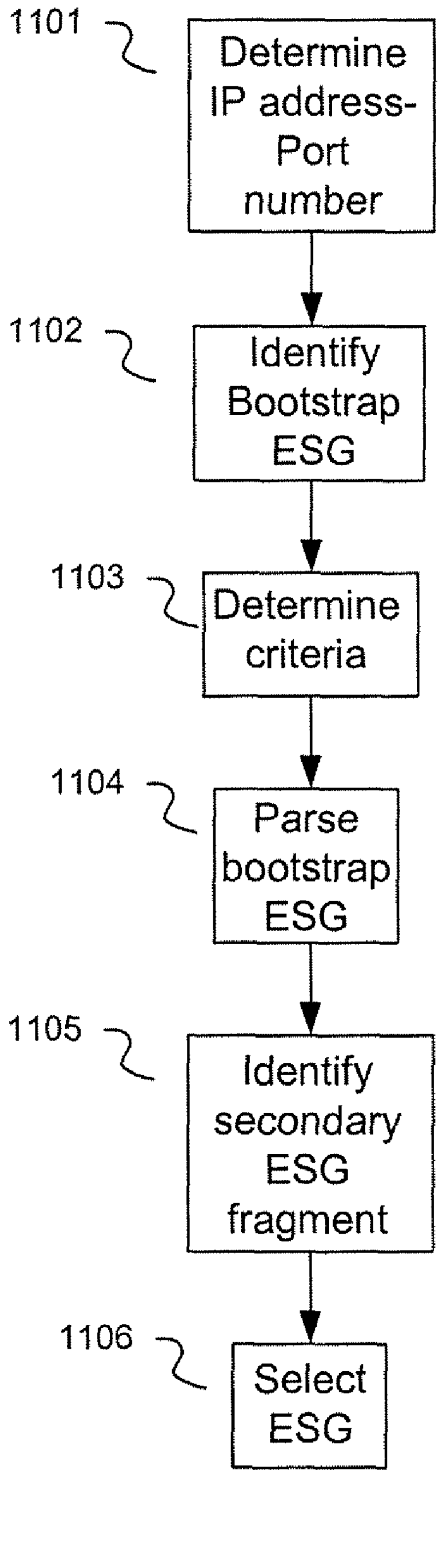
FIG. 11 is a flowchart illustrating an example of identifying a desired ESG in a bootstrap ESG in which one or more illustrative embodiments of the invention may be implemented.

FIG. 11 is a flowchart illustrating an example of identifying a desired ESG fragment corresponding to a program or service in accordance with one or more embodiments of the invention. A bootstrap ESG may be identified, the bootstrap ESG containing information on a plurality of ESG fragments. In STEP 1101 of the example illustrated in FIG. 11, an IP address and port number is determined corresponding to a bootstrap ESG. Based on the IP address and port number, the bootstrap ESG is identified (STEP 1102). A user or subscriber at a mobile terminal may desire a particular program or service or ESG associated with a corresponding ESG fragment. The ESG fragment of the desired program or service or ESG may be included in the identified bootstrap ESG. The criteria are determined in STEP 1103 for identifying the desired ESG fragment. For example, a user or subscriber at a mobile terminal may desire a program or ESG from a specified operator or service provider, or a particular free program or purchasable program or service, a particular valid program or service in a range of valid dates or times, etc. The bootstrap ESG may be parsed (STEP 1104) to determine an ESG fragment corresponding to the determined criteria from STEP 1103. In STEP 1105, a secondary ESG fragment (i.e., an ESG fragment referred to by the bootstrap ESG or another ESG) may be identified in the bootstrap ESG corresponding to the determined criteria. In STEP 1106, the desired secondary ESG fragment is selected. Information pertaining to the secondary ESG fragment may, for example, be downloaded to the mobile terminal.

In addition, the secondary ESG fragments may further contain information on, or refer to, other ESG fragments. Also, the bootstrap ESG may contain information on, or refer to, an ESG fragment that is also referred to by another secondary ESG fragment.

In accordance with an embodiment of the invention, ESG bootstrapping of the type described in ETSI TS 102 471 (clauses 4 and 9) and in ETSI TR 102 469 clause 5.2.3 may be used, and the entry point for an ESG may be as described in OMA BCAST Service Guide (section 6.1).

Embodiments of the invention are directed to receiving ESG information on a mobile terminal by performing one or more of the following operations: switching on and starting a set-up process in the terminal, starting an ESG bootstrap process, listening to an ESG bootstrap stream, storing a network address in the terminal, in a fixed memory location, receiving an address of the ESG bootstrap stream at the beginning of the set-up process from a network or from a memory of the terminal, storing one or more found ESG delivery descriptors with metadata, which may describe one or more standards supported by the network, an ESG service operator, an ESG style (simplified, standard, enriched), memory need (simplified, standard, enriched), level of service (free, standard, all), a new cell ID/network (NW) ID, and the like. A specific ESG delivery descriptor may be selected, for example, by a filter, which describes one or more pieces of metadata, such as one or more standards/specifications supported by the network, the terminal, an ESG service operator, an ESG style (simplified, standard, enriched), memory need (simplified, standard, enriched), level of service (free, standard, all), a new cell ID/NW ID. Filtering may be performed according to preferred ESG standard and/or preferred ESG service operator, by preferred ESG standard, ESG service operator, and/or ESG style. One or more filtering criteria may be set-up by an ESG service operator and/or a terminal user. Filtering criteria may be set up by an operator and/or automatically by the terminal. Following filtering of ESG descriptors from an ESG bootstrap stream, ESG fragments may be received based on the filtering results, or, in other words, in accordance with a specific ESG delivery descriptor of the ESG bootstrap stream. Filtering ESG delivery descriptors and receiving and storing ESG fragments based on the filtering results, in accordance with embodiments of the invention, may be referred to herein as automatic electronic service guide (ESG) selection. The ESG bootstrap process may be started under various circumstances, including, but not limited to, at specific time intervals and/or when the terminal recognizes a new cell ID/NW ID.

Figure 12:
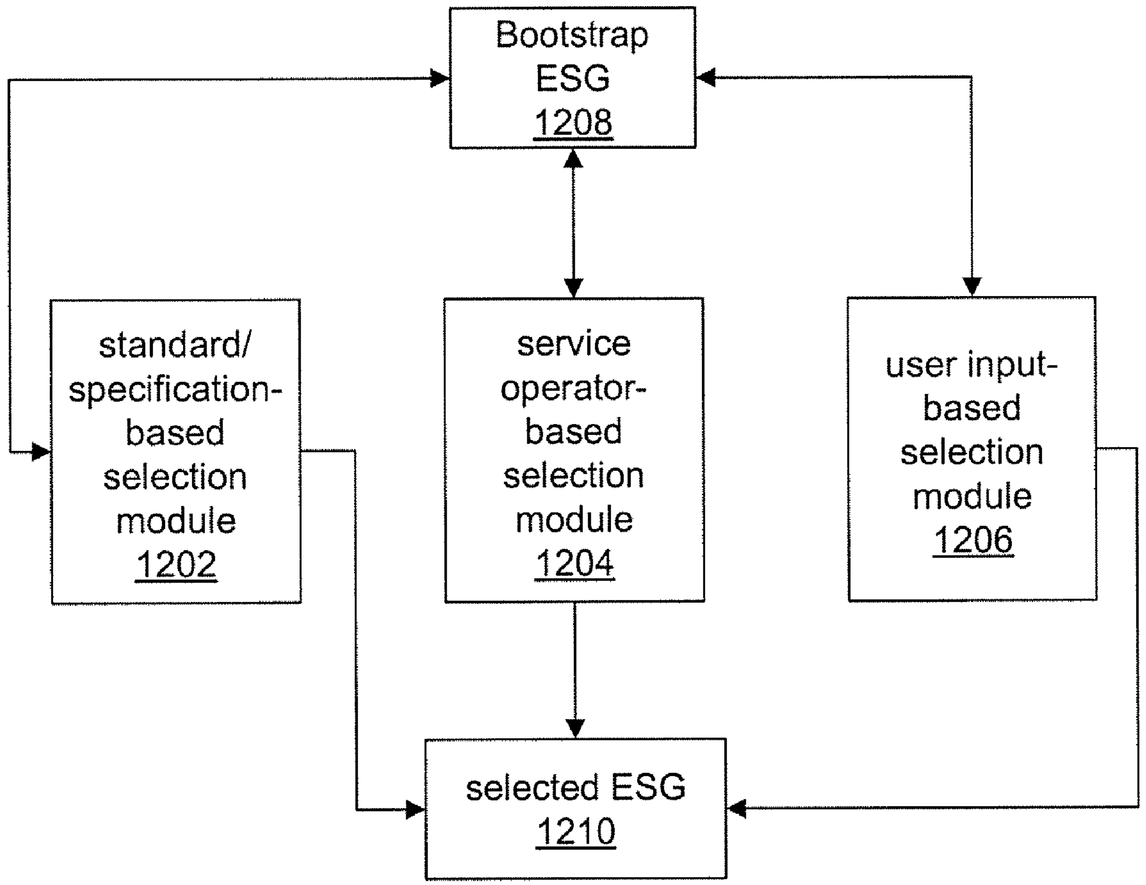
FIG. 12 is a block diagram illustrating an example of system for performing automatic ESG selection in accordance with various embodiments of the invention.

FIG. 12 is a block diagram illustrating an example of system for performing automatic ESG selection in accordance with various embodiments of the invention. Standard/specification-based selection module 1202 accesses ESG bootstrap stream 1208 (also referred to herein as bootstrap ESG) as shown by the double-headed arrow between these two components in FIG. 12. Standard/specification-based selection module 1202 may output a selected ESG 1210, under circumstances discussed below in connection with FIG. 14.

Similarly, service operator-based selection module 1204 accesses bootstrap 1208 as shown by the double-headed arrow between these two components in FIG. 12. Service operator-based selection module 1204 may output a selected ESG 1210, under circumstances discussed below in connection with FIG. 16.

User input-based selection module 1206 accesses bootstrap 1208 as shown by the double-headed arrow between these two components in FIG. 12. User input-based selection module 1206 may output a selected ESG 1210, under circumstances discussed below in connection with FIG. 18.

Figure 13:
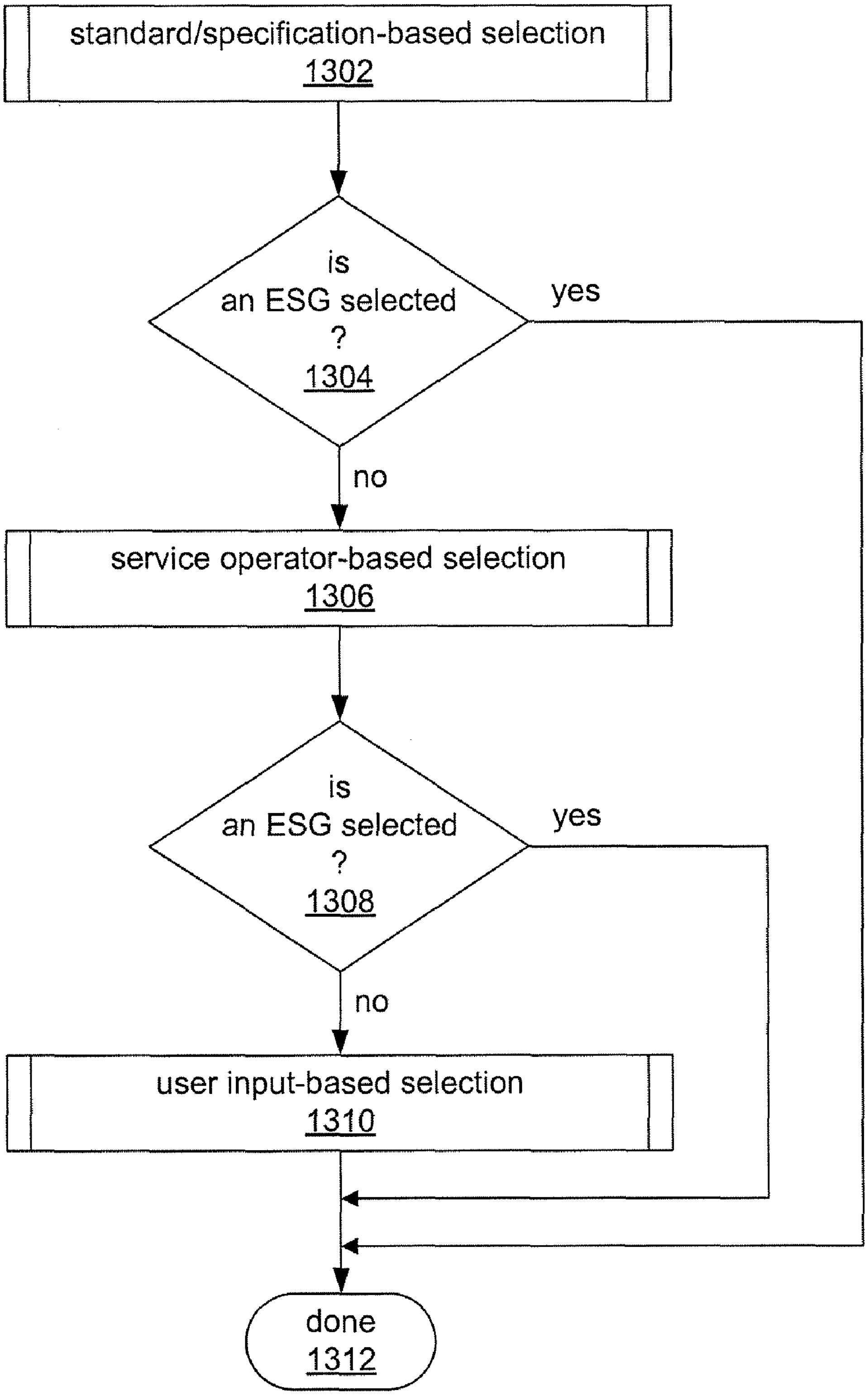
FIG. 13 is a high level flow chart showing steps for automatically selecting an ESG in accordance with embodiments of the invention.
Figure 14:
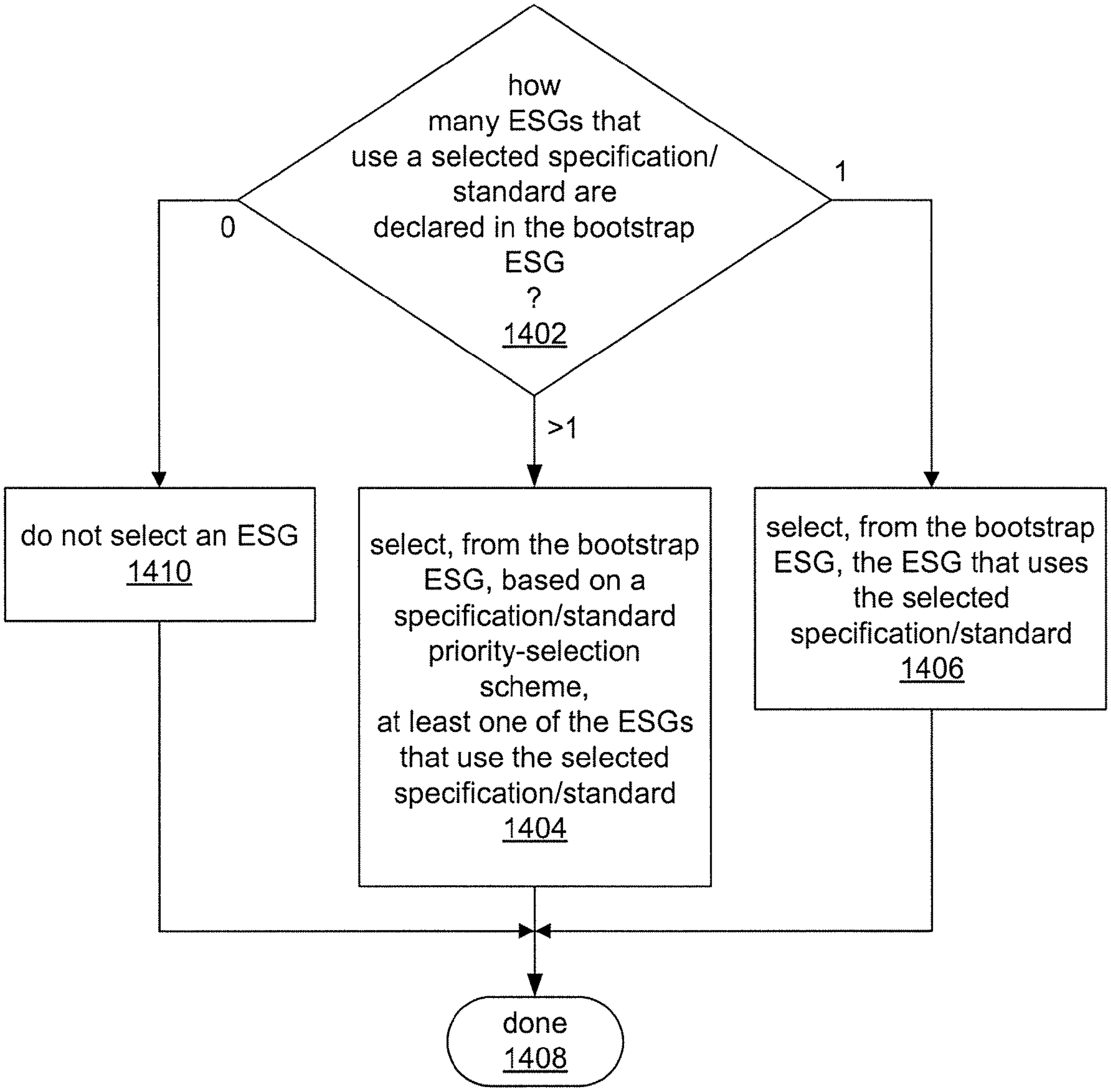
FIG. 14 is a flowchart showing steps for performing standard/specification-based selection in accordance with an embodiment of the invention.
Figure 16:
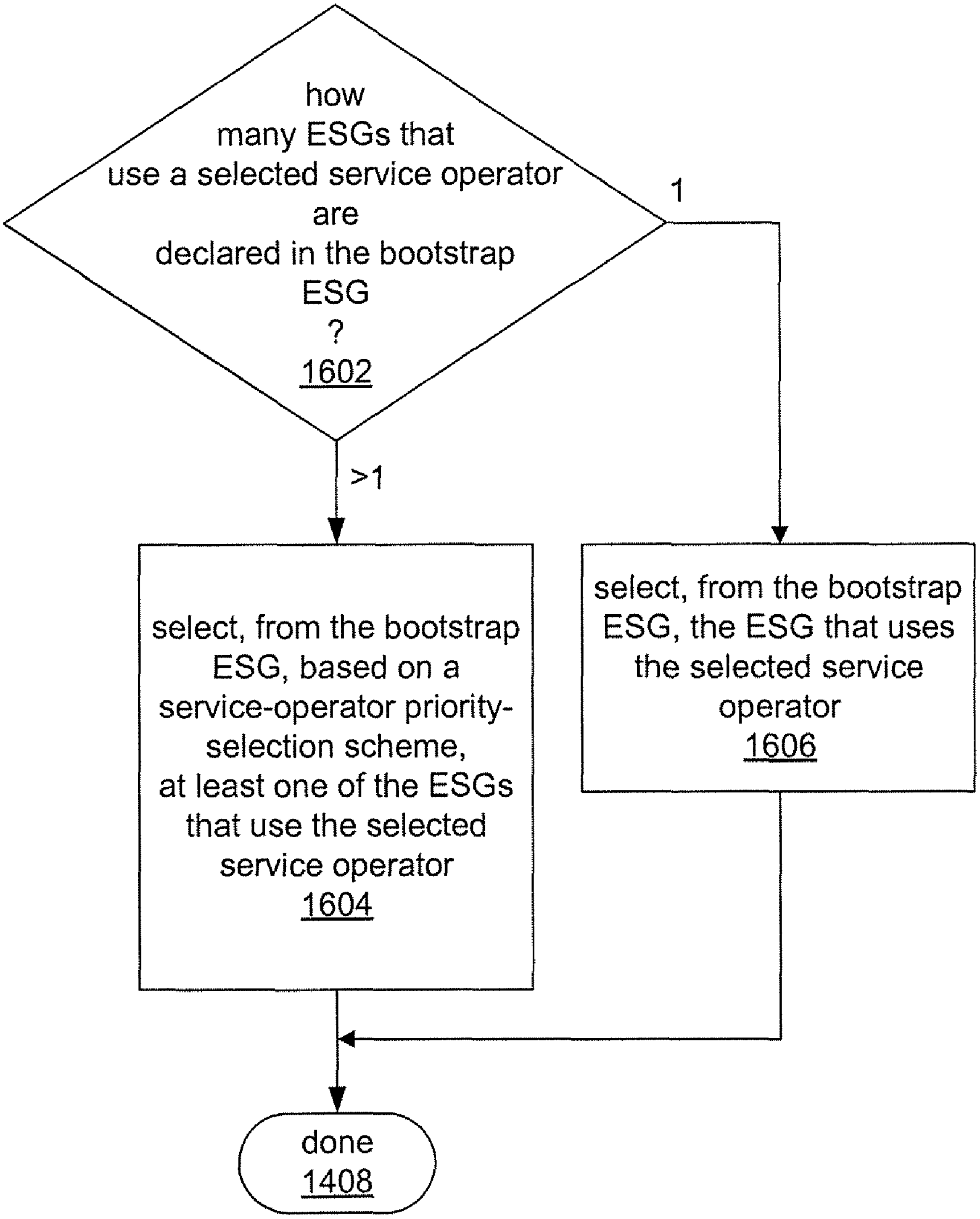
FIG. 16 is a flowchart showing steps for performing service operator-based selection in accordance with an embodiment of the invention.
Figure 18:
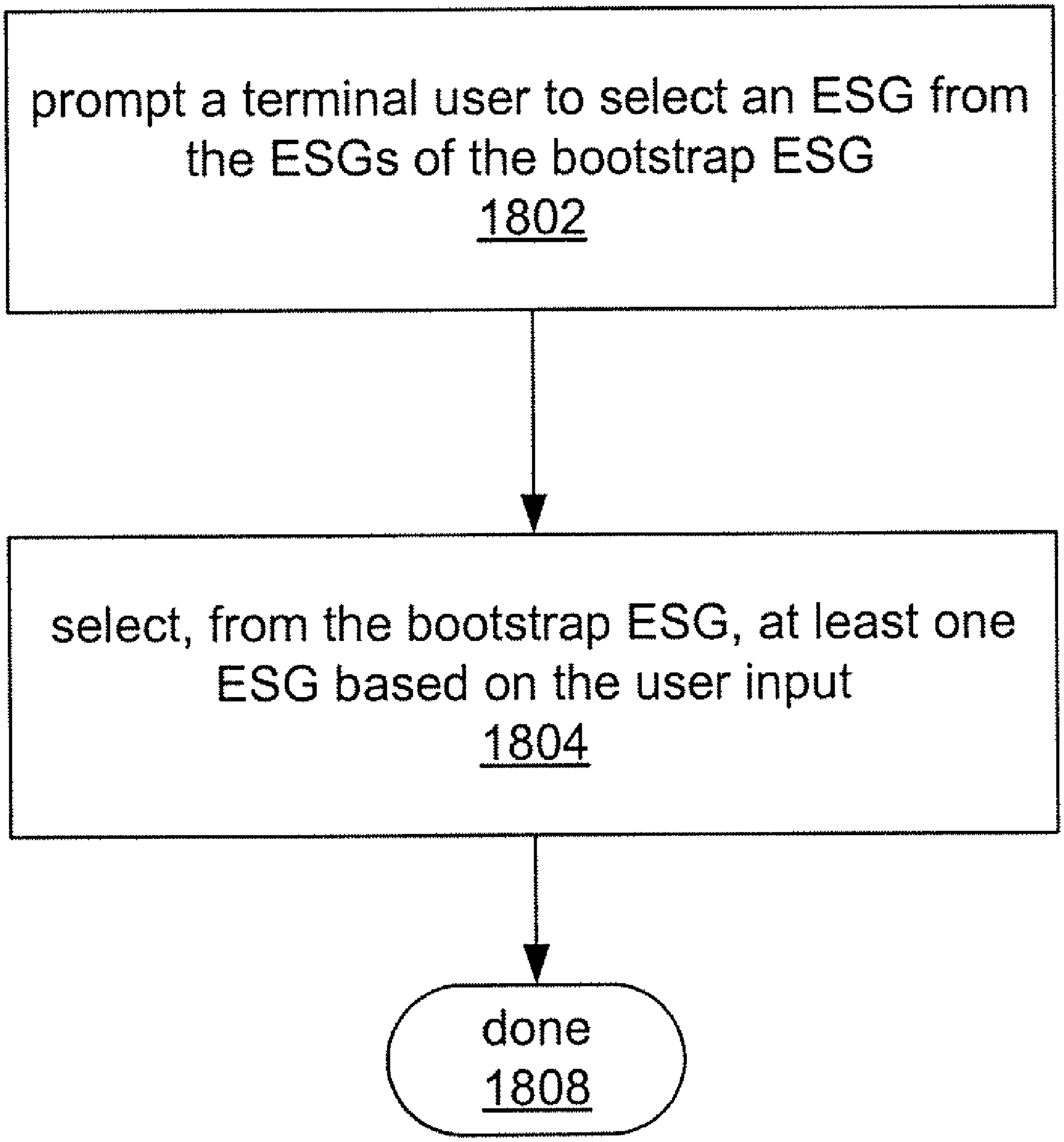
FIG. 18 is a flowchart showing steps for performing user input-based selection in accordance with an embodiment of the invention.

FIG. 13 is a high level flow chart showing steps for automatically selecting an ESG in accordance with embodiments of the invention. Standard/specification-based selection, which is discussed in connection with FIG. 14, is performed, as shown at 1302. If an ESG was selected during step 1302, then the yes branch is followed from 1304 and processing is done, as shown at 1312. Otherwise, service operator-based selection, which is discussed in connection with FIG. 16, is performed as shown at 1306. In accordance with at least one embodiment, service operator-based selection, which is discussed in connection with FIG. 16, may be performed even though an ESG was selected during step 1302. For example, a particular ESG may be provided by multiple service operators. If an ESG was selected during step 1306, then the yes branch is followed from 1308 and processing is done, as shown at 1312. Otherwise, user input-based selection, which is discussed in connection with FIG. 18, is performed as shown at 1310 and then processing is done as shown at 1312.

FIG. 14 is a flowchart showing steps for performing standard/specification-based selection in accordance with an embodiment of the invention. As shown at 1402, a determination is made with respect to how many ESGs that use a selected specification/standard are declared in the bootstrap ESG. If the bootstrap ESG declares 1 ESG that uses the selected specification/standard, then the ESG that uses the selected specification/standard is selected from the bootstrap ESG as shown at 1406 and processing is done as shown at 1408. Otherwise, if the bootstrap ESG declares more than 1 ESG that uses the selected specification/standard, then at least one of the ESGs that use the selected specification/standard is selected from the bootstrap ESG based on a specification/standard priority-selection scheme as shown at 1404. Example specification/standards include, but are not limited to, Digital Video Broadcasting (DVB) CBMS (Convergence of Broadcast and Mobile Services), Open Mobile Alliance (OMA) Broadcast (BCAST) and OAI (Open Air Interface, which is a Nokia-specific specification/standard). Any other suitable standard/specification supported by a mobile terminal may also be used. Any suitable specification/standard priority-selection scheme may be used. For instance, a preconfigured specification/standard priority list, which specifies relative priorities between various specifications/standards, may be stored by a mobile terminal or may be user determined. If the bootstrap ESG does not declare an ESG that uses the selected specification/standard, then no ESG is selected, as shown at 1410.

Figure 15:
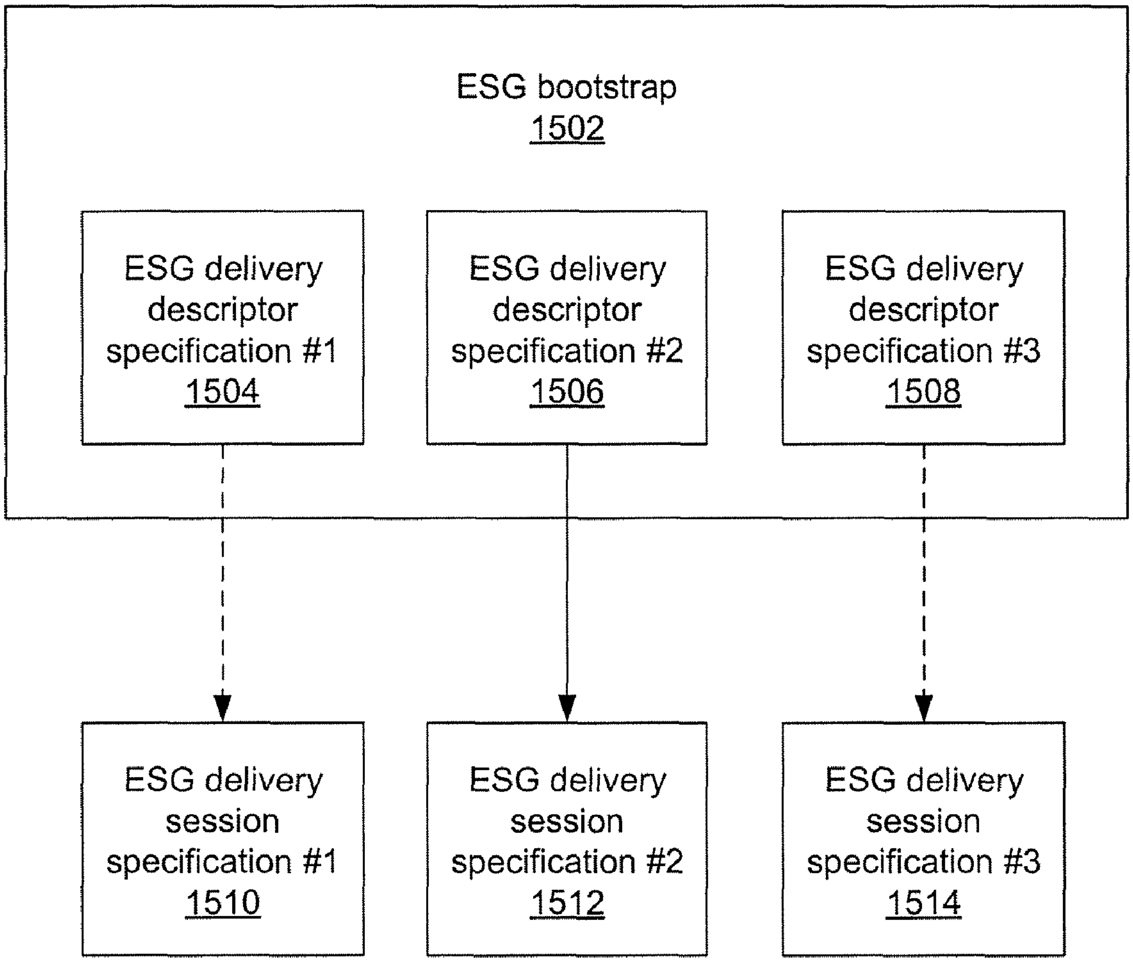
FIG. 15 is a diagram showing selection of an ESG in accordance with an embodiment of the invention.

FIG. 15 is a diagram showing selection of an ESG in accordance with an embodiment of the invention. Assume that specification #2 has a higher priority than specifications #1 and #3. Then, ESG delivery session 1512, which uses specification #2 is selected in accordance with the specification/standard priority-selection scheme as indicated by the solid arrow between 1506 and 1512. And ESG delivery sessions 1510 and 1514, which use specifications #1 and #3, respectively, are not selected in accordance with the specification/standard priority-selection scheme as indicated by the dashed arrows between 1504 and 1510 and 1508 and 1514, respectively.

FIG. 16 is a flowchart showing steps for performing service operator-based selection in accordance with an embodiment of the invention. As shown at 1602, a determination is made with respect to how many ESGs that use a selected service operator are declared in the bootstrap ESG. If the bootstrap ESG declares 1 ESG that uses the selected service operator, then the ESG that uses the selected service operator is selected from the bootstrap ESG as shown at 1606 and processing is done as shown at 1608. Otherwise, if the bootstrap ESG declares more than 1 ESG that uses the selected service operator, then at least one of the ESGs that use the selected service operator is selected from the bootstrap ESG based on a service-operator priority-selection scheme as shown at 1604. Any suitable service operator priority-selection scheme may be used. For instance, a preconfigured service-operator priority list, which specifies relative priorities between various service operators, may be stored by a mobile terminal, or may be user determined.

Figure 17:
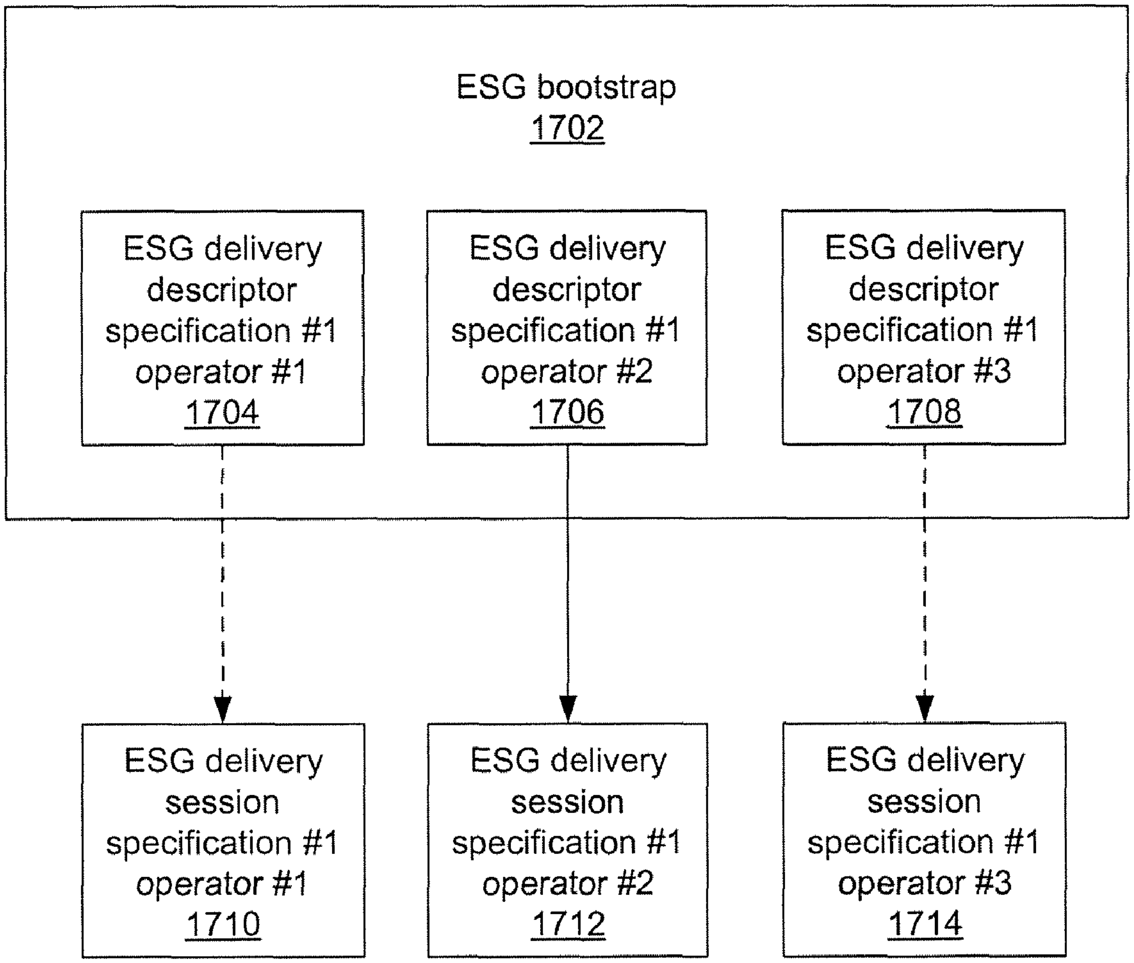
FIG. 17 is a diagram showing selection of an ESG in accordance with an embodiment of the invention.

FIG. 17 is a diagram showing selection of an ESG in accordance with an embodiment of the invention. Assume that service operator #2 has a higher priority than service operators #1 and #3. Then, ESG delivery session 1712, which uses service operator #2 is selected in accordance with the service-operator priority-selection scheme as indicated by the solid arrow between 1706 and 1712. And ESG delivery sessions 1710 and 1714, which use service operators #1 and #3, respectively, are not selected in accordance with the service-operator priority-selection scheme as indicated by the dashed arrows between 1704 and 1710 and 1708 and 1714, respectively.

FIG. 18 is a flowchart showing steps for performing user input-based selection in accordance with an embodiment of the invention. As shown at 1802, a terminal user is prompted to select an ESG from the ESGs of the bootstrap ESG. Then, at least one ESG is selected from the bootstrap based on the user input, as shown at 1804. Processing is then done as shown at 1808.

Figure 19:
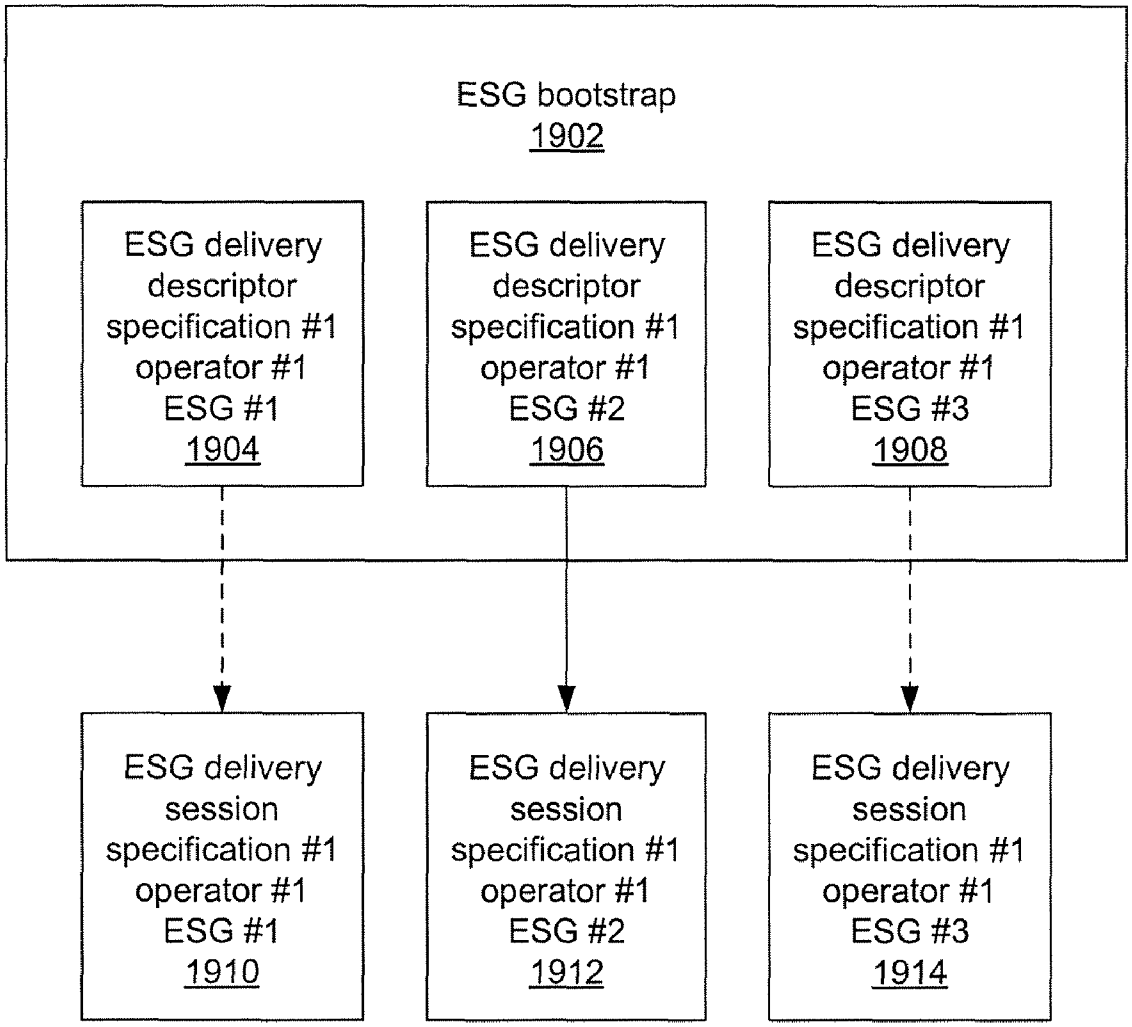
FIG. 19 is a diagram showing selection of an ESG in accordance with an embodiment of the invention.

FIG. 19 is a diagram showing selection of an ESG in accordance with an embodiment of the invention. Assume that the user, when prompted, specifies that ESG #2 should be selected. Then, ESG delivery session 1912, which includes ESG #2, is selected in accordance with the user input, as indicated by the solid arrow between 1906 and 1912. And ESG delivery sessions 1910 and 1914, which include ESGs #1 and #3, respectively, are not selected in accordance with the user input as indicated by the dashed arrows between 1904 and 1910 and 1908 and 1914, respectively.

Embodiments of the invention include any novel feature or combination of features disclosed herein either explicitly or any generalization thereof. While embodiments of the invention have been described with respect to specific examples including various illustrative modes of carrying out the invention, those skilled in the art will appreciate that there are numerous variations and permutations of the above described systems and techniques. For example, ESG selection may be applied multiple times and may use different ESG selection criteria at various levels of an ESG hierarchy. Thus, the spirit and scope of the invention should be construed broadly as set forth in the appended claims.

The invention claimed is:

1. A method comprising:

identifying a bootstrap electronic service guide specifying a selected specification or standard;

determining how many electronic service guides use the selected specification or standard, wherein the electronic service guides are represented as digital data;

selecting, from the bootstrap electronic service guide, based on a specification or standard priority-selection scheme, at least one of the electronic service guides that use the selected specification or standard.

2. The method of claim 1, further comprising:

determining how many electronic service guides that use a selected service operator are declared in the bootstrap electronic service guide; and selecting, from the bootstrap electronic service guide, based on a service-operator priority-selection scheme, at least one of the electronic service guides that use the selected service operator.

3. The method of claim 2, further comprising: generating a prompt for selection of an electronic service guide from the electronic service guides declared in the bootstrap electronic service guide.

4. The method of claim 1, wherein the selected specification or standard is either Digital Video Broadcast (DVB) CBMS, Open Mobile Alliance (OMA) BCAST, or Open Air Interface (OAI).

5. The method of claim 1, wherein the bootstrap electronic service guide includes information on availability or scope of the electronic service guides to a user.

6. The method of claim 1, wherein the bootstrap electronic service guide includes service operator information, network addresses for the electronic service guides, port numbers for electronic service guides, purchasing information for the electronic service guides, purchasing channel associated with the electronic service guides, uniform resource identifier (URI) of the electronic service guide, information indicating last update of one of the electronic service guides, information indicating next expected update of one of the ESGs, validity dates or times for one of the electronic service guides, or a combination thereof.

7. The method of claim 1, wherein the bootstrap electronic service guide is associated with a designated one of a plurality of electronic service guide providers.

8. The method of claim 1, further comprising:

receiving the bootstrap electronic service guide from an electronic service guide aggregator.

9. The method of claim 8, wherein the electronic service guide aggregator is a datacast operator.

10. The method of claim 1, further comprising:

generating a request for the bootstrap electronic service guide; and receiving one or more access parameters for tuning to an announcement channel to receive the bootstrap electronic service guide.

11. An apparatus comprising:

at least one processor; and at least one memory including computer program code, the at least one memory and the computer program code configured to, with the at least one processor, cause the apparatus to perform at least the following, identify a bootstrap electronic service guide specifying a selected specification or standard;

determine how many electronic service guides use the selected specification or standard, wherein the electronic service guides are represented as digital data;

select, from the bootstrap electronic service guides, based on a specification or standard priority-selection scheme, at least one of the electronic service guides that use the selected specification or standard.

12. The apparatus of claim 11, wherein the apparatus is further caused, at least in part, to:

generate a prompt for selection of an electronic service guide from the electronic service guides declared in the bootstrap electronic service guide.

13. The apparatus of claim 11, wherein the selected specification or standard is either Digital Video Broadcast (DVB) CBMS, Open Mobile Alliance (OMA) BCAST, or Open Air Interface (OAI).

14. The apparatus of claim 11, wherein the bootstrap electronic service guide includes information on availability or scope of the electronic service guides to a user.

15. The apparatus of claim 11, wherein the bootstrap electronic service guide includes service operator information, network addresses for the electronic service guides, port numbers for electronic service guides, purchasing information for the electronic service guides, purchasing channel associated with the electronic service guides, uniform resource identifier (URI) of the electronic service guide, information indicating last update of one of the electronic service guides, information indicating next expected update of one of the electronic service guides, validity dates or times for one of the electronic service guides, or a combination thereof.

16. The apparatus of claim 11, wherein the bootstrap electronic service guide is associated with a designated one of a plurality of electronic service guide providers.

17. The apparatus of claim 11, wherein the apparatus is further caused, at least in part, to:

receive the bootstrap electronic service guide from an electronic service guide aggregator.

18. The apparatus of claim 17, wherein the electronic service guide aggregator is a datacast operator.

19. The apparatus of claim 11, wherein the apparatus is further caused, at least in part, to:

generate a request for the bootstrap electronic service guide; and receive one or more access parameters for tuning to an announcement channel to receive the bootstrap electronic service guide.

20. A non-transitory computer-readable storage medium containing computer executable instructions for causing an apparatus to perform operations comprising:

identifying a bootstrap electronic service guide specifying a selected specification or standard;

determining how many electronic service guides use the selected specification or standard, wherein the electronic service guides are represented as digital data;

selecting, from the bootstrap electronic service guide, based on a specification or standard priority-selection scheme, at least one of the electronic service guides that use the selected specification or standard.

21. The non-transitory computer-readable storage medium of claim 20, containing computer executable instructions for causing the apparatus to perform further operations comprising:

determining how many electronic service guides that use a selected service operator are declared in the bootstrap electronic service guide; and selecting, from the bootstrap electronic service guide, based on a service-operator priority-selection scheme, at least one of the ESGs that use the selected service operator.

22. The non-transitory computer-readable storage medium of claim 21, wherein the apparatus is further caused to perform:

generating a prompt for selection of an electronic service guide from the electronic service guides declared in the bootstrap electronic service guide.

23. The non-transitory computer-readable storage medium of claim 20, wherein the selected specification or standard is either Digital Video Broadcast (DVB) CBMS, Open Mobile Alliance (OMA) BCAST, or Open Air Interface (OAI).

24. An apparatus comprising:

means for identifying a bootstrap electronic service guide specifying a selected specification or standard;

means for determining how many electronic service guides use the selected specification/standard, wherein the electronic service guides are represented as digital data; and means for selecting, from the bootstrap electronic service guide, based on a specification or standard priority-selection scheme, at least one of the electronic service guides that use the selected specification or standard.

25. The apparatus of claim 24, further comprising:

means for determining how many electronic service guides that use a selected service operator are declared in the bootstrap electronic service guide; and means for selecting, from the bootstrap electronic service guide, based on a service-operator priority-selection scheme, at least one of the ESGs that use the selected service operator.

26. The apparatus of claim 25, further comprising: means for generating a prompt for selection of an electronic service guide from the electronic service guides declared in the bootstrap electronic service guide.

* * * * *